(12) United States Patent
Someya et al.

(10) Patent No.: US 11,500,315 B2
(45) Date of Patent: Nov. 15, 2022

(54) HEATING DEVICE, IMAGE FORMING APPARATUS, AND THERMOCOMPRESSION BONDING APPARATUS HAVING A DISPLACEMENT RESTRICTOR

(71) Applicants: Yukimichi Someya, Saitama (JP);
Tomoya Adachi, Kanagawa (JP);
Yuusuke Furuichi, Kanagawa (JP)

(72) Inventors: Yukimichi Someya, Saitama (JP);
Tomoya Adachi, Kanagawa (JP);
Yuusuke Furuichi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/241,233

(22) Filed: Apr. 27, 2021

(65) Prior Publication Data

US 2021/0364958 A1 Nov. 25, 2021

(30) Foreign Application Priority Data

May 19, 2020 (JP) .............................. JP2020-087550

(51) Int. Cl.
*G03G 15/20* (2006.01)
*B32B 37/06* (2006.01)

(52) U.S. Cl.
CPC ......... *G03G 15/2053* (2013.01); *B32B 37/06* (2013.01); *G03G 15/2064* (2013.01); *G03G 2215/2032* (2013.01)

(58) Field of Classification Search
CPC ........... G03G 15/2053; G03G 21/1642; G03G 21/1647; G03G 21/652; G03G 21/16; G03G 2215/2025; H01R 12/712; H01R 12/714; H01R 12/721
See application file for complete search history.

(56) References Cited

U.S. PATENT DOCUMENTS

| 2014/0105634 A1* | 4/2014 | Tanaka ............... G03G 15/2042 |
| | | 399/329 |
| 2015/0277309 A1* | 10/2015 | Kuroda .............. G03G 15/2053 |
| | | 399/329 |
| 2018/0253054 A1* | 9/2018 | Tanto ................. G03G 21/1685 |
| 2019/0196374 A1 | 6/2019 | Adachi et al. |
| 2019/0278206 A1 | 9/2019 | Adachi et al. |
| 2019/0286026 A1 | 9/2019 | Furuichi et al. |

(Continued)

FOREIGN PATENT DOCUMENTS

| JP | 2004-335275 | 11/2004 |
| JP | 2014-081524 | 5/2014 |

(Continued)

OTHER PUBLICATIONS

U.S. Appl. No. 17/259,450, filed Sep. 17, 2019, Yuusuke Furuichi, et al.

*Primary Examiner* — Arlene Heredia
(74) *Attorney, Agent, or Firm* — Harness, Dickey & Pierce, P.L.C.

(57) ABSTRACT

A heating device includes a heater and a feeding member. The heater includes a base and an electrode mounted on an electrode mounting face of the base. The feeding member includes a connector terminal and a restrictor. The connector terminal contacts the electrode. The restrictor engages the heater and restricts displacement of the feeding member relative to the heater.

15 Claims, 29 Drawing Sheets

(56) References Cited

U.S. PATENT DOCUMENTS

| | | |
|---|---|---|
| 2019/0286027 A1 | 9/2019 | Someya et al. |
| 2019/0286028 A1 | 9/2019 | Furuichi et al. |
| 2019/0286029 A1 | 9/2019 | Adachi et al. |
| 2020/0033766 A1 | 1/2020 | Hase et al. |
| 2020/0033767 A1 | 1/2020 | Adachi et al. |
| 2020/0033768 A1 | 1/2020 | Furuichi et al. |
| 2020/0033771 A1 | 1/2020 | Furuichi et al. |
| 2020/0033775 A1 | 1/2020 | Inoue et al. |
| 2020/0033776 A1 | 1/2020 | Yoshinaga et al. |
| 2020/0103796 A1 | 4/2020 | Furuichi et al. |
| 2020/0103799 A1 | 4/2020 | Adachi et al. |
| 2020/0103814 A1 | 4/2020 | Someya et al. |
| 2020/0249601 A1 | 8/2020 | Inoue et al. |
| 2020/0292972 A1 | 9/2020 | Inoue et al. |
| 2020/0379384 A1 | 12/2020 | Samei et al. |
| 2020/0387096 A1 | 12/2020 | Adachi et al. |
| 2020/0401067 A1 | 12/2020 | Samei et al. |

FOREIGN PATENT DOCUMENTS

| | | |
|---|---|---|
| JP | 2015-191734 | 11/2015 |
| JP | 2016-166910 | 9/2016 |
| JP | 2019-012634 | 1/2019 |
| JP | 2019-032399 | 2/2019 |
| JP | 2020-201385 | 12/2020 |

\* cited by examiner

HEATING DEVICE, IMAGE FORMING APPARATUS, AND THERMOCOMPRESSION BONDING APPARATUS HAVING A DISPLACEMENT RESTRICTOR

CROSS-REFERENCE TO RELATED APPLICATION

This patent application is based on and claims priority pursuant to 35 U.S.C. § 119(a) to Japanese Patent Application No. 2020-087550, filed on May 19, 2020, in the Japan Patent Office, the entire disclosure of which is hereby incorporated by reference herein.

BACKGROUND

Technical Field

Exemplary aspects of the present disclosure relate to a heating device, an image forming apparatus, and a thermocompression bonding apparatus.

Discussion of the Background Art

Related-art image forming apparatuses, such as copiers, facsimile machines, printers, and multifunction peripherals (MFP) having two or more of copying, printing, scanning, facsimile, plotter, and other functions, typically form an image on a recording medium according to image data by electrophotography.

Such image forming apparatuses include a heating device such as a fixing device that fixes a toner image on a sheet serving as a recording medium under heat and a dryer that dries ink on a sheet.

SUMMARY

This specification describes below an improved heating device. In one embodiment, the heating device includes a heater and a feeding member. The heater includes a base and an electrode mounted on an electrode mounting face of the base. The feeding member includes a connector terminal and a restrictor. The connector terminal contacts the electrode. The restrictor engages the heater and restricts displacement of the feeding member relative to the heater.

This specification further describes an improved image forming apparatus. In one embodiment, the image forming apparatus includes an image forming device that forms an image and the heating device described above that heats a recording medium bearing the image.

This specification further describes an improved thermocompression bonding apparatus. In one embodiment, the thermocompression bonding apparatus includes a rotator that conveys a film and the heating device described above that heats the film.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

Figure 1:
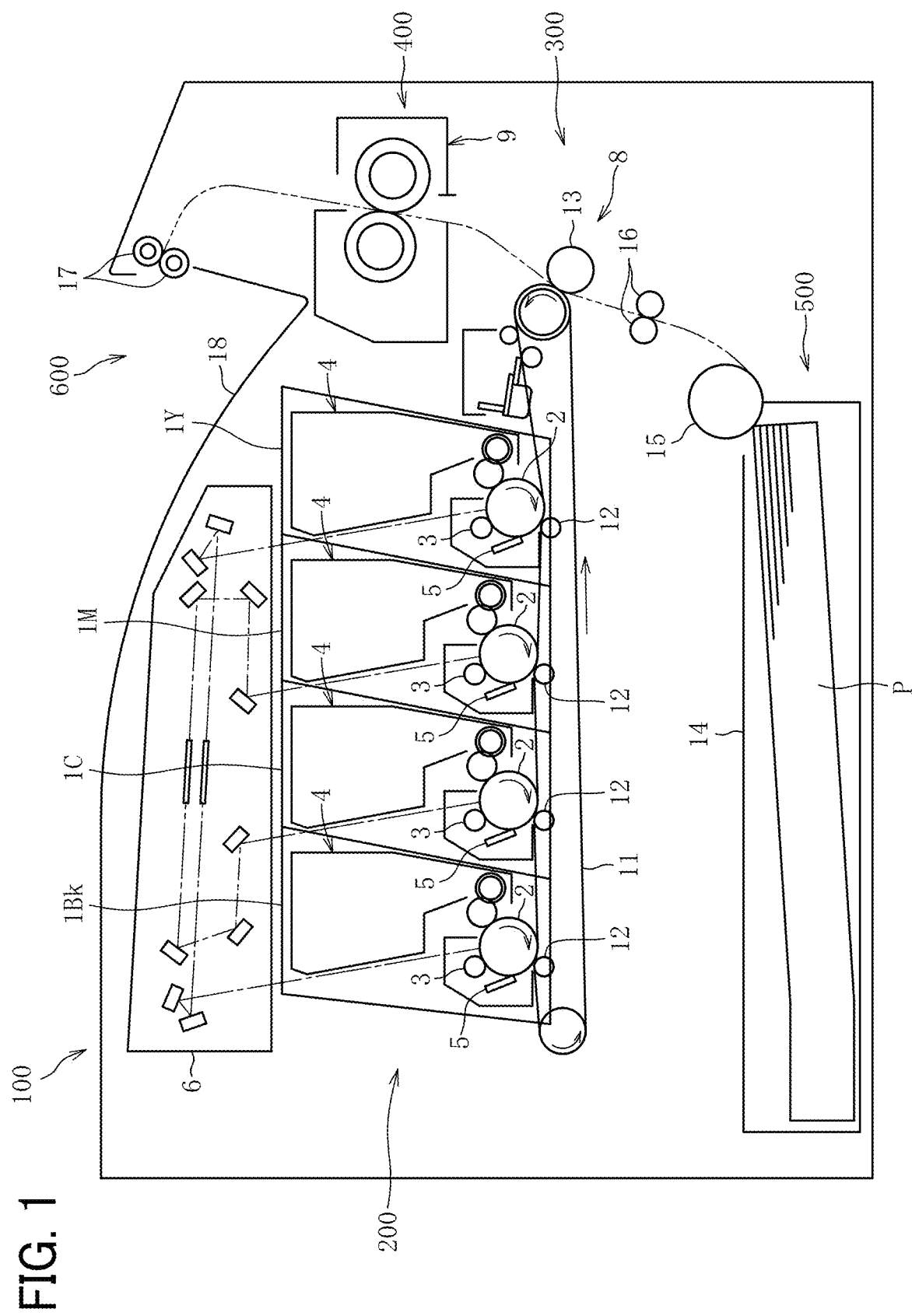
FIG. 1 is a schematic cross-sectional view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Referring to the attached drawings, the following describes embodiments of the present disclosure.

In the drawings for explaining the embodiments of the present disclosure, identical reference numerals are assigned to elements such as members and parts that have an identical function or an identical shape as long as differentiation is possible and a description of those elements is omitted once the description is provided.

FIG. 1 is a schematic cross-sectional view of an image forming apparatus 100 according to an embodiment of the present disclosure.

As illustrated in FIG. 1, the image forming apparatus 100 includes an image forming portion 200, a transfer portion 300, a fixing portion 400, a recording medium supply portion 500, and a recording medium ejecting portion 600.

The image forming portion 200 includes four image forming units 1Y, 1M, 1C, and 1Bk and an exposure device 6. The image forming units 1Y, 1M, 1C, and 1Bk serving as image forming devices, respectively, are removably installed in an apparatus body of the image forming apparatus 100. The image forming units 1Y, 1M, 1C, and 1Bk basically have a similar construction except that the image forming units 1Y, 1M, 1C, and 1Bk contain developers in different colors, that is, yellow, magenta, cyan, and black, respectively, which correspond to color separation components for a color image. For example, each of the image forming units 1Y, 1M, 1C, and 1Bk includes a photoconductor 2, a charging roller 3, a developing device 4, and a cleaning blade 5. The photoconductor 2 serves as an image bearer that bears a toner image on a surface of the photoconductor 2. The charging roller 3 serves as a charger that charges the surface of the photoconductor 2. The developing device 4 serves as developing means that forms the toner image on the photoconductor 2. The cleaning blade 5 serves as a cleaner that cleans the surface of the photoconductor 2. The exposure device 6 exposes the charged surface of each of the photoconductors 2 according to image data, thus serving as a latent image former that forms an electrostatic latent image on each of the photoconductors 2.

The transfer portion 300 includes a transfer device 8 that transfers the toner image onto a sheet P serving as a recording medium. The recording media onto which the toner image is formed or transferred include a resin sheet such as an overhead projector (OHP) transparency in addition to paper such as plain paper, thick paper, thin paper, coated paper, a label sheet, and an envelope. The transfer device 8 includes an intermediate transfer belt 11, four primary transfer rollers 12, and a secondary transfer roller 13. The intermediate transfer belt 11 serves as a transfer or that bears the toner image, that is to be transferred onto the sheet P, on a surface of the intermediate transfer belt 11. The intermediate transfer belt 11 is an endless belt. The primary transfer rollers 12 are pressed against the photoconductors 2, respectively, via the intermediate transfer belt 11. Thus, the intermediate transfer belt 11 contacts each of the photoconductors 2, forming a primary transfer nip therebetween. On the other hand, the secondary transfer roller 13 is pressed against one of a plurality of rollers across which the intermediate transfer belt 11 is stretched taut via the intermediate transfer belt 11. Thus, a secondary transfer nip is formed between the secondary transfer roller 13 and the intermediate transfer belt 11.

The fixing portion 400 includes a fixing device 9 including a heating device that heats the sheet P. The fixing device 9 fixes the toner image on the sheet P under heat.

The recording medium supply portion 500 includes a sheet tray 14 and a sheet feeding roller 15. The sheet tray 14 loads a plurality of sheets P. The sheet feeding roller 15 picks up and feeds a sheet P from the sheet tray 14.

The recording medium ejecting portion 600 includes a sheet ejecting roller pair 17 and a sheet ejection tray 18. The sheet ejecting roller pair 17 ejects the sheet P onto an outside of the image forming apparatus 100. The sheet ejection tray 18 is placed with the sheet P ejected by the sheet ejecting roller pair 17.

Referring to FIG. 1, a description is provided of printing processes performed by the image forming apparatus 100 according to this embodiment.

When the image forming apparatus 100 receives an instruction to start printing, a driver starts driving and rotating the photoconductor 2 of each of the image forming units 1Y, 1M, 1C, and 1Bk and the intermediate transfer belt 11. As the sheet feeding roller 15 rotates, the sheet feeding roller 15 feeds a sheet P from the sheet tray 14. As the sheet P fed by the sheet feeding roller 15 comes into contact with a timing roller pair 16, the timing roller pair 16 temporarily halts the sheet P.

The charging roller 3 of each of the image forming units 1Y, 1M, 1C, and 1Bk charges the surface of the photoconductor 2 evenly at a high electric potential. The exposure device 6 exposes the charged surfaces of the photoconductors 2, respectively, according to image data sent from a terminal. Accordingly, the electric potential of an exposed portion on the surface of each of the photoconductors 2 decreases, forming an electrostatic latent image on the surface of each of the photoconductors 2. The developing device 4 of each of the image forming units 1Y, 1M, 1C, and 1Bk supplies toner to the electrostatic latent image formed on the photoconductor 2, forming a toner image thereon. When the toner images formed on the photoconductors 2 reach the primary transfer nips defined by the primary transfer rollers 12 in accordance with rotation of the photoconductors 2, respectively, the toner images formed on the photoconductors 2 are transferred onto the intermediate transfer belt 11 driven and rotated counterclockwise in FIG. 1 successively such that the toner images are superimposed on the intermediate transfer belt 11. Thus, a full color toner image is formed on the intermediate transfer belt 11. After the toner image formed on the photoconductor 2 is transferred onto the intermediate transfer belt 11, the cleaning blade 5 removes residual toner and a foreign substance remained on the photoconductor 2 therefrom. A protective agent supply supplies an image bearer protective agent onto the surface of the photoconductor 2, that is cleaned by the cleaning blade 5, to compensate for an amount of the image bearer protective agent scraped off the photoconductor 2, so that the photoconductor 2 is ready for next formation of an electrostatic latent image.

The full color toner image formed on the intermediate transfer belt 11 is conveyed to the secondary transfer nip defined by the secondary transfer roller 13 in accordance with rotation of the intermediate transfer belt 11 and is transferred onto a sheet P conveyed by the timing roller pair 16. The sheet P transferred with the full color toner image is conveyed to the fixing device 9 that fixes the full color toner image on the sheet P. Thereafter, the sheet ejecting roller pair 17 ejects the sheet P onto the sheet ejection tray 18, thus finishing a series of printing processes.

The above describes the printing processes to form the full color toner image on the sheet P. Alternatively, one of the four image forming units 1Y, 1M, 1C, and 1Bk may be used to form a monochrome toner image or two or three of the four image forming units 1Y, 1M, 1C, and 1Bk may be used to form a bicolor toner image or a tricolor toner image.

A description is provided of a construction of the fixing device 9 according to this embodiment.

Figure 2:
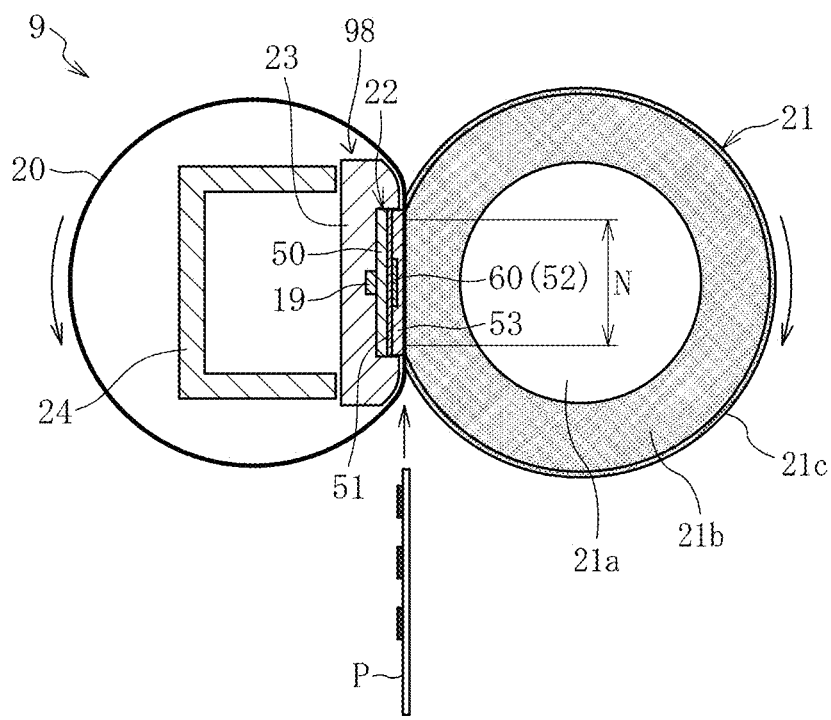
FIG. 2 is a schematic cross-sectional view of a fixing device incorporated in the image forming apparatus depicted in FIG. 1.

As illustrated in FIG. 2, the fixing device 9 according to this embodiment includes a fixing belt 20, a pressure roller 21, a heater 22, a heater holder 23, a stay 24, and a temperature sensor 19. The fixing device 9 further includes a heating device 98 that includes the heater 22, the heater holder 23, and a connector 70 described below with reference to FIG. 9.

The fixing belt 20 serves as a first rotator that is rotatable. The fixing belt 20 is disposed opposite an unfixed toner image bearing side (e.g., an imaging side) of a sheet P, that bears an unfixed toner image. The fixing belt 20 serves as a fixing rotator or a fixing member that fixes the unfixed toner image on the sheet P. For example, the fixing belt 20 is an endless belt that has an outer diameter of 25 mm and a thickness in a range of from 40 μm to 120 μm and includes a tubular base. The base is made of polyamide. Alternatively, the base may be made of heat resistant resin such as polyether ether ketone (PEEK) or metal such as nickel and stainless used steel (SUS). In order to enhance durability of the fixing belt 20 and facilitate separation of toner of the toner image on the sheet P from the fixing belt 20, a release layer made of fluororesin such as perfluoroalkoxy alkane (PFA) and polytetrafluoroethylene (PTFE) may be disposed on an outer circumferential surface of the base. Optionally, an elastic layer that is made of rubber or the like may be interposed between the base and the release layer. An inner circumferential surface of the base may be coated with a slide layer made of polyimide, PTFE, or the like.

The pressure roller 21 serves as a second rotator that is rotatable and separately provided from the fixing belt 20. The pressure roller 21 serves as an opposed rotator or an opposed member that is disposed opposite an outer circumferential surface of the fixing belt 20. The pressure roller 21 also serves as a pressure rotator or a pressure member that is pressed against the outer circumferential surface of the fixing belt 20 to form a fixing nip N between the fixing belt 20 and the pressure roller 21. For example, the pressure roller 21 has an outer diameter of 25 mm. The pressure roller 21 is a roller or the like constructed of a cored bar 21a, an elastic layer 21b disposed on an outer circumferential surface of the cored bar 21a, and a release layer 21c disposed on an outer circumferential surface of the elastic layer 21b. The cored bar 21a is made of iron. The elastic layer 21b is made of silicone rubber. The release layer 21c is made of fluororesin.

The heater 22 is disposed inside a loop formed by the fixing belt 20. The heater 22 heats the fixing belt 20 and the sheet P through the fixing belt 20. According to this embodiment, the heater 22 includes a base 50 that is platy, a first insulating layer 51 mounted on the base 50, a conductor layer 52 mounted on the first insulating layer 51, and a second insulating layer 53 coating the conductor layer 52. The conductor layer 52 includes a heat generating portion 60.

For example, the base 50 is made of metal such as SUS, iron, copper, a copper alloy, and aluminum. Instead of metal, the base 50 may be made of ceramic such as alumina, aluminum nitride, and beryllia, glass, or the like. If the base 50 is made of an insulating material such as ceramic, the first insulating layer 51 sandwiched between the base 50 and the conductor layer 52 may be omitted. Since metal has an enhanced durability against rapid heating and is processed readily, metal is preferably used to reduce manufacturing costs. Among metals, aluminum and copper are preferable because aluminum and copper attain an increased thermal conductivity and barely suffer from uneven temperature. Stainless steel is advantageous because stainless steel is manufactured at reduced costs compared to aluminum and copper.

For example, each of the first insulating layer 51 and the second insulating layer 53 is made of an insulating material such as heat resistant glass. Alternatively, each of the first insulating layer 51 and the second insulating layer 53 may be made of ceramic, polyimide, or the like. Additionally, an insulating layer may be mounted on an opposite face of the base 50, that is opposite a face of the base 50, that mounts the first insulating layer 51 and the second insulating layer 53.

According to this embodiment, the base 50 is disposed opposite the fixing nip N via the heat generating portion 60. Alternatively, the heat generating portion 60 may be disposed opposite the fixing nip N via the base 50. In this case, heat generated by the heat generating portion 60 is conducted to the fixing belt 20 through the base 50. Hence, the base 50 is preferably made of a material having an increased thermal conductivity, such as aluminum nitride.

According to this embodiment, in order to enhance efficiency in conduction of heat from the heater 22 to the fixing belt 20, the heater 22 contacts an inner circumferential surface of the fixing belt 20 directly. Alternatively, the heater 22 may not contact the fixing belt 20 or may be disposed opposite the fixing belt 20 indirectly via a low friction sheet or the like. The heater 22 may contact the outer circumferential surface of the fixing belt 20, in order to prevent the heater 22 from damaging the outer circumferential surface of the fixing belt 20 and resultant degradation in quality of the toner image fixed on the sheet P, the heater 22 preferably contacts the inner circumferential surface of the fixing belt 20.

The heater holder 23 serves as a holder that supports the heater 22. The heater holder 23 is disposed inside the loop formed by the fixing belt 20. Since the heater holder 23 is subject to temperature increase by heat from the heater 22, the heater holder 23 is preferably made of a heat resistant material. For example, if the heater holder 23 is made of heat resistant resin having a decreased thermal conductivity, such as liquid crystal polymer (LCP) and PEEK, while the heater holder 23 attains heat resistance, the heater holder 23 suppresses conduction of heat thereto from the heater 22, facilitating heating of the fixing belt 20.

The stay 24 serves as a reinforcement that is disposed inside the loop formed by the fixing belt 20. The stay 24 supports an opposite face of the heater holder 23, that is opposite a nip side face of the heater holder 23, that is disposed opposite the fixing nip N, thus preventing the heater holder 23 from being bent by pressure from the pressure roller 21. Thus, the fixing nip N, having an even length in a sheet conveyance direction in which the sheet P is conveyed, is formed between the fixing belt 20 and the pressure roller 21. The stay 24 is preferably made of ferrous metal such as SUS and steel electrolytic cold commercial (SECC) to achieve rigidity.

The temperature sensor 19 serves as a temperature detector that detects the temperature of the heater 22. A controller controls output to the heater 22 based on the temperature of the heater 22, that is detected by the temperature sensor 19, thus retaining a desired temperature (e.g., a fixing temperature) of the fixing belt 20. The temperature sensor 19 may be a contact type sensor that contacts the heater 22 or a non-contact type sensor that does not contact the heater 22. For example, general temperature sensors such as a thermopile, a thermostat, a thermistor, and a normally closed (NC) sensor are used as the temperature sensor 19.

In the fixing device 9 according to this embodiment, when printing starts, as the heater 22 is supplied with power, the heat generating portion 60 generates heat, heating the fixing belt 20. A driver drives and rotates the pressure roller 21 and the fixing belt 20 starts rotation in accordance with rotation of the pressure roller 21. In a state in which the temperature of the fixing belt 20 reaches a predetermined target temperature (e.g., a fixing temperature), as a sheet P bearing an unfixed toner image is conveyed through the fixing nip N formed between the fixing belt 20 and the pressure roller 21 as illustrated in FIG. 2, the fixing belt 20 and the pressure roller 21 fix the unfixed toner image on the sheet P under heat and pressure.

Figure 3:
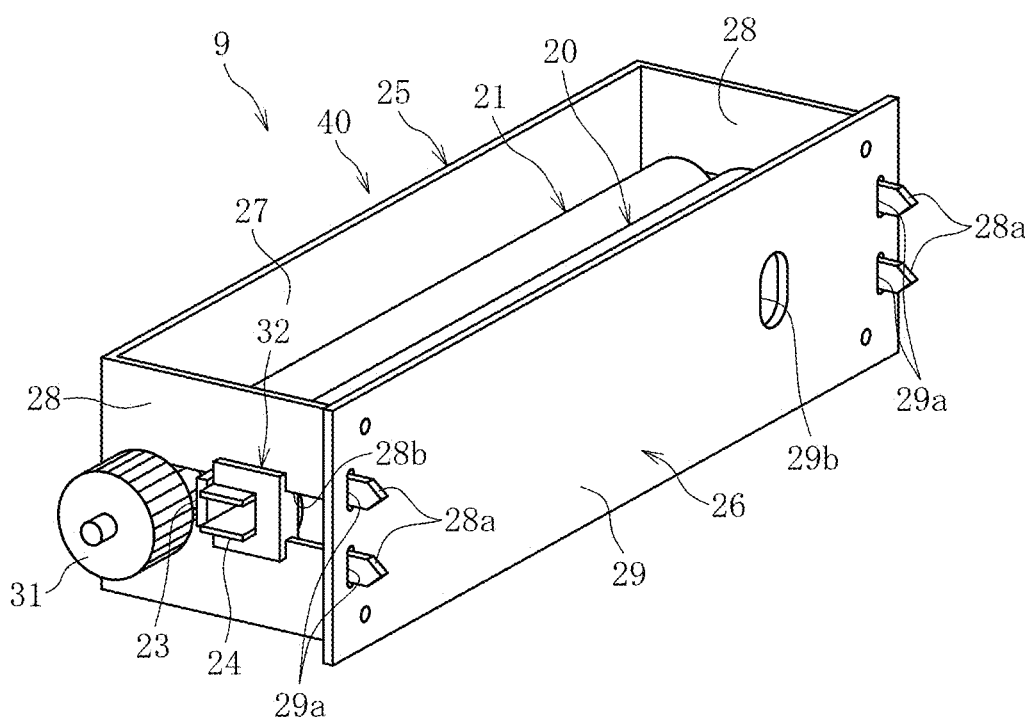
FIG. 3 is a perspective view of the fixing device depicted in FIG. 2.
Figure 4:
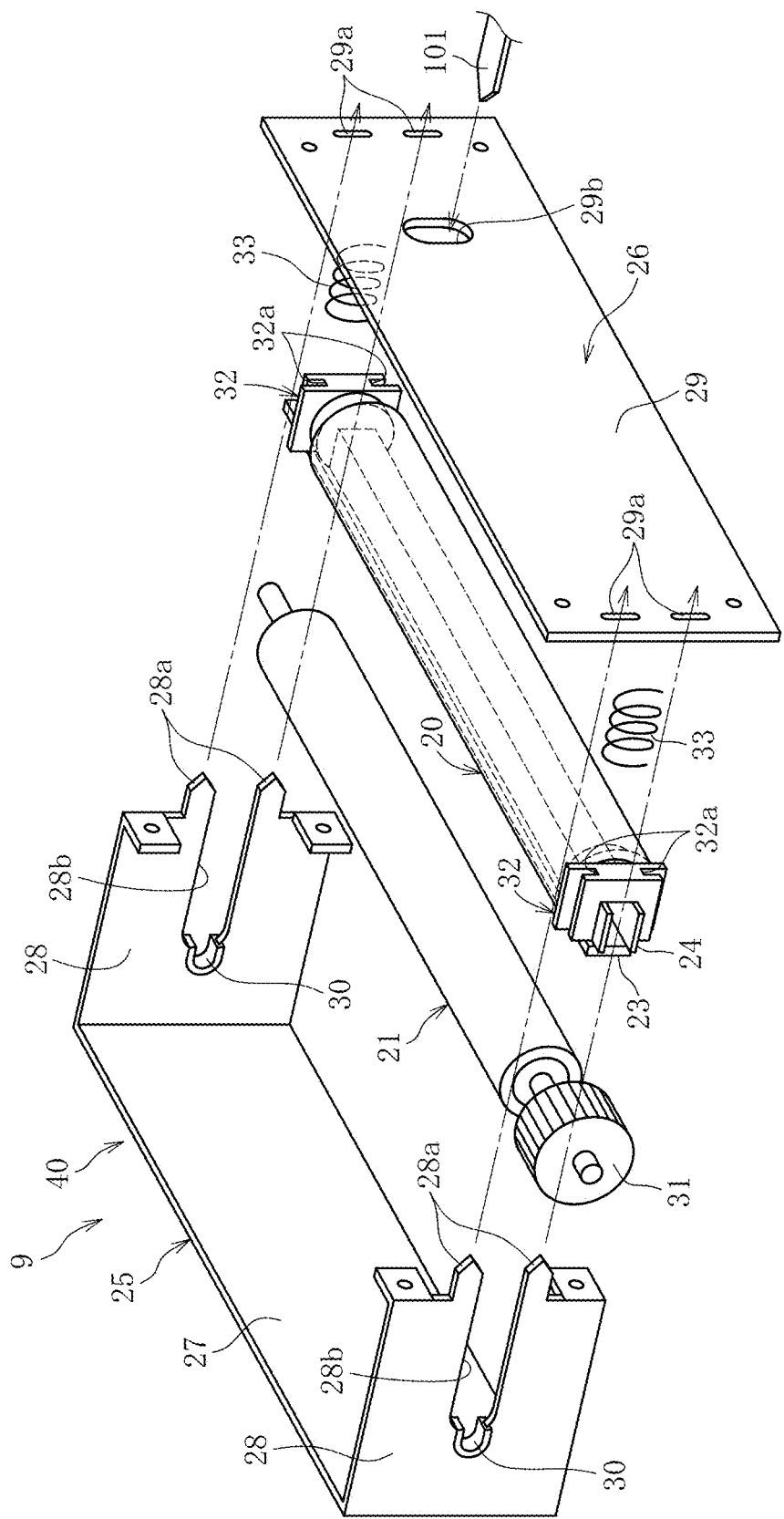
FIG. 4 is an exploded perspective view of the fixing device depicted in FIG. 3.

FIG. 3 is a perspective view of the fixing device 9 according to this embodiment. FIG. 4 is an exploded perspective view of the fixing device 9.

As illustrated in FIGS. 3 and 4, the fixing device 9 according to this embodiment includes a device frame 40 that is rectangular. The device frame 40 includes a first device frame 25 and a second device frame 26. The first device frame 25 includes a pair of side walls 28 and a front wall 27 combined with the side walls 28. The second device frame 26 includes a rear wall 29. As a plurality of engaging projections 28a mounted on the pair of side walls 28 engages a plurality of engaging holes 29a penetrating through the rear wall 29, respectively, the first device frame 25 is coupled to the second device frame 26.

The pair of side walls 28 supports the fixing belt 20 and the pressure roller 21. Each of the side walls 28 includes an insertion recess 28b through which a rotation shaft of the pressure roller 21 and the like are inserted. The insertion recess 28b is open at one end thereof (e.g., an opening that faces the rear wall 29) and closed at another end (e.g., a bottom that is opposite the opening) that serves as a contact portion. The contact portion includes a bearing 30 that rotatably supports the rotation shaft of the pressure roller 21. In a state in which the side walls 28 support the pressure roller 21, a driving force transmitting gear 31 is exposed outside the side wall 28. The driving force transmitting gear 31 serves as a driving force transmitter disposed at one lateral end of the pressure roller 21 in an axial direction thereof. Accordingly, when the fixing device 9 is installed in the apparatus body of the image forming apparatus 100, the driving force transmitting gear 31 is coupled to a gear disposed inside the apparatus body of the image forming apparatus 100 so that the driving force transmitting gear 31 transmits a driving force from the driver. Alternatively, the driving force transmitter that transmits the driving force to the pressure roller 21 may be pulleys across which a driving force transmitting belt is stretched taut, a coupler, and the like, instead of the driving force transmitting gear 31.

A pair of supports 32 that supports the fixing belt 20, the stay 24, and the like is disposed at both lateral ends of the fixing belt 20 in a longitudinal direction thereof, respectively. Each of the supports 32 includes guide grooves 32a. As illustrated in FIG. 4, in a state in which the pair of supports 32, the fixing belt 20, the stay 24, the heater holder 23, and the heater 22 are installed in the fixing device 9, as the guide grooves 32a of each of the supports 32 move along edges of the insertion recess 28b of each of the side walls 28, respectively, and enter the insertion recess 28b, each of the supports 32 is attached to the side wall 28. Thus, the fixing belt 20, the stay 24, the heater holder 23, and the heater 22 are supported by the side walls 28. As a pair of springs 33, serving as biasing members interposed between the rear wall 29 and the supports 32, biases the supports 32 toward the pressure roller 21, respectively, the fixing belt 20 is pressed against the pressure roller 21 to form the fixing nip N between the fixing belt 20 and the pressure roller 21.

A hole 29b penetrates through the rear wall 29 and serves as a positioner that positions a device body of the fixing device 9 with respect to the apparatus body of the image forming apparatus 100. On the other hand, as illustrated in FIG. 4, a projection 101 serving as a positioner is disposed in the apparatus body of the image forming apparatus 100. As the projection 101 is inserted into the hole 29b of the fixing device 9, the projection 101 engages the hole 29b, positioning the device body of the fixing device 9 with respect to the apparatus body of the image forming apparatus 100. The hole 29b is preferably disposed at a position in one lateral end or another lateral end of the rear wall 29 and outboard from a center of the rear wall 29 in a longitudinal direction thereof. The hole 29b disposed at the position described above allows thermal expansion and shrinkage of the rear wall 29 in the longitudinal direction thereof in one lateral end or another lateral end of the rear wall 29 where the hole 29b is not situated, thus suppressing bending of the device frame 40.

Figure 5:
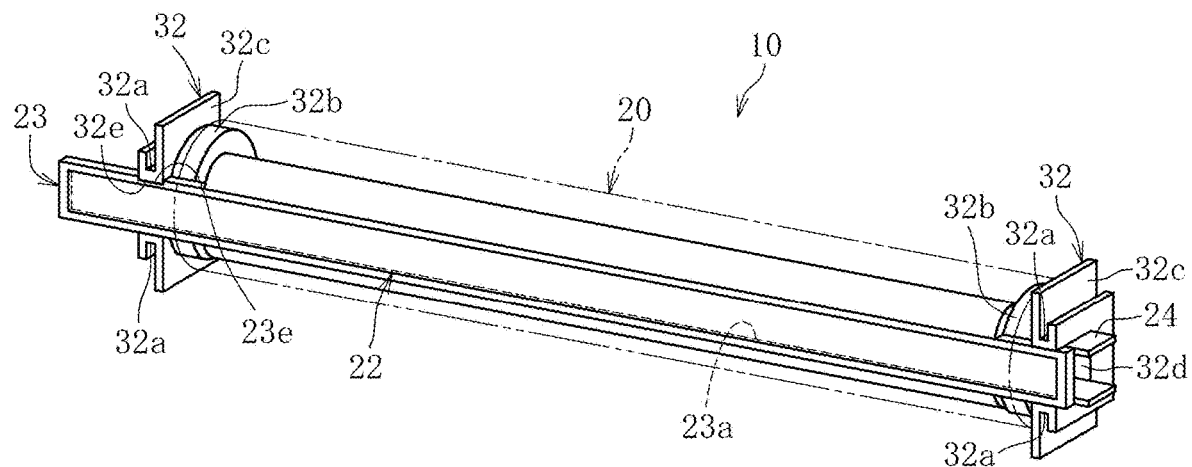
FIG. 5 is a perspective view of a heating unit incorporated in the fixing device depicted in FIG. 2.
Figure 6:
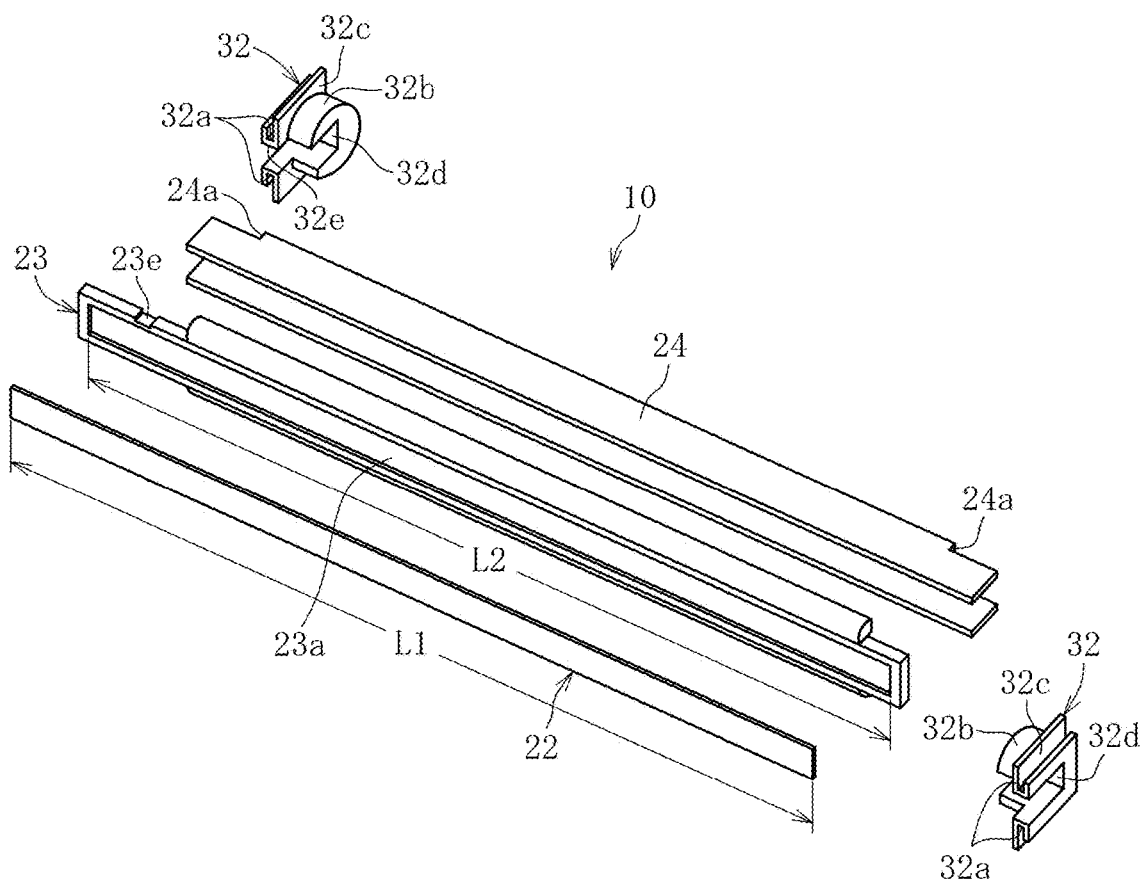
FIG. 6 is an exploded perspective view of the heating unit depicted in FIG. 5.

FIG. 5 is a perspective view of a heating unit 10 incorporated in the fixing device 9, illustrating the pair of supports 32 that supports the heater 22 and the like. FIG. 6 is an exploded perspective view of the heating unit 10.

As illustrated in FIG. 5, the heater 22 and the heater holder 23 extend horizontally in FIG. 5 in a longitudinal direction thereof. In a state in which the heater 22 and the heater holder 23 are installed in the fixing device 9, the heater 22 and the heater holder 23 extend in the longitudinal direction thereof that is parallel to the longitudinal direction of the fixing belt 20 or the axial direction of the pressure roller 21. Similarly, the stay 24 also extends in a longitudinal direction thereof that is parallel to the longitudinal direction of the fixing belt 20 or the axial direction of the pressure roller 21.

As illustrated in FIGS. 5 and 6, the heater holder 23 includes an accommodating recess 23*a* that is rectangular and accommodates the heater 22. The accommodating recess 23*a* has a shape and a size that are substantially equivalent to those of the heater 22. However, a length L2 of the accommodating recess 23*a* in a longitudinal direction thereof is somewhat greater than a length L1 of the heater 22 in the longitudinal direction thereof. Accordingly, even if the heater 22 is elongated in the longitudinal direction thereof due to thermal expansion, the heater 22 does not interfere with the accommodating recess 23*a*.

Each of the pair of supports 32 includes a belt support 32*b*, a belt restrictor 32*c*, and a supporting recess 32*d*. The belt support 32*b* is C-shaped and inserted into the loop formed by the fixing belt 20, thus contacting the inner circumferential surface of the fixing belt 20 to support the fixing belt 20. The belt restrictor 32*c* is a flange that contacts an edge face of the fixing belt 20 to restrict motion (e.g., skew) of the fixing belt 20 in the longitudinal direction thereof. The supporting recess 32*d* is inserted with a lateral end (e.g., a lateral end portion disposed in proximity to a lateral edge) of each of the heater holder 23 and the stay 24 in the longitudinal direction thereof, thus supporting the heater holder 23 and the stay 24. The belt supports 32*b* are inserted into the loop formed by the fixing belt 20 at both lateral ends of the fixing belt 20 in the longitudinal direction thereof, respectively. Hence, the belt supports 32*b* support the fixing belt 20 in a state in which the fixing belt 20 is not basically applied with tension in a circumferential direction (e.g., a rotation direction of the fixing belt 20) thereof while the fixing belt 20 does not rotate, that is, by a free belt system.

As illustrated in FIGS. 5 and 6, the heater holder 23 includes a positioning recess 23*e*, serving as a positioner, disposed at a position in one lateral end of the heater holder 23, that is outboard from a center of the heater holder 23 in the longitudinal direction thereof. The support 32 includes an engagement 32*e* illustrated in a left part in FIGS. 5 and 6. The engagement 32*e* engages the positioning recess 23*e*, positioning the heater holder 23 with respect to the support 32 in the longitudinal direction of the heater holder 23. The support 32 illustrated in a right part in FIGS. 5 and 6 does not include the engagement 32*e* and therefore the heater holder 23 is not positioned with respect to the support 32 in the longitudinal direction of the heater holder 23. As described above, the heater holder 23 is positioned with respect to the support 32 at one lateral end of the heater holder 23 in the longitudinal direction thereof. Thus, the support 32 allows thermal expansion and shrinkage of the heater holder 23 in the longitudinal direction thereof due to temperature change.

As illustrated in FIG. 6, the stay 24 includes steps 24*a* disposed at both lateral ends (e.g., the lateral end portions disposed in proximity to the lateral edges) of the stay 24 in the longitudinal direction thereof, respectively. The steps 24*a* restrict motion of the stay 24 with respect to the supports 32, respectively, in the longitudinal direction of the stay 24. As the step 24*a* comes into contact with the support 32, the step 24*a* restricts motion of the stay 24 with respect to the support 32 in the longitudinal direction of the stay 24. A gap (e.g., backlash) is provided between at least one of the steps 24*a* and the support 32. Thus, the gap is provided between at least one of the steps 24*a* and the support 32 so that the support 32 allows thermal expansion and shrinkage of the stay 24 due to temperature change.

Figure 7:
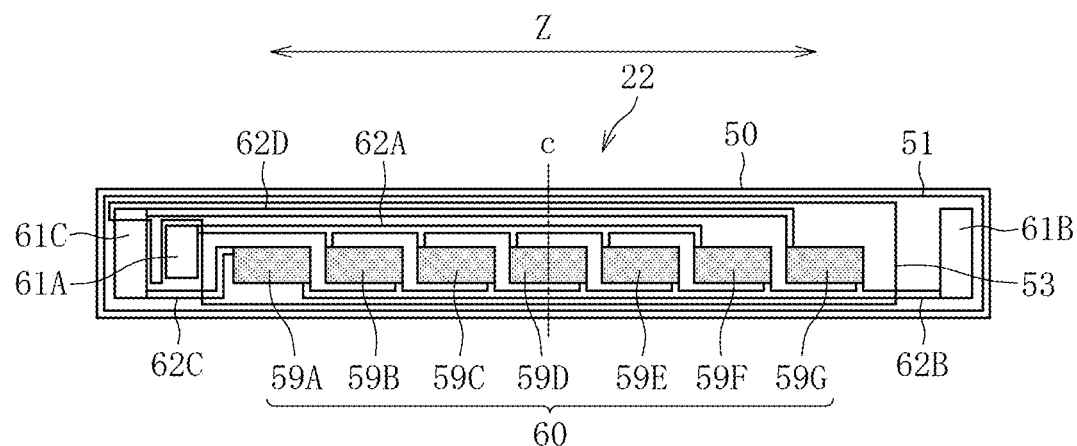
FIG. 7 is a plan view of a heater incorporated in the fixing device depicted in FIG. 2.
Figure 8:
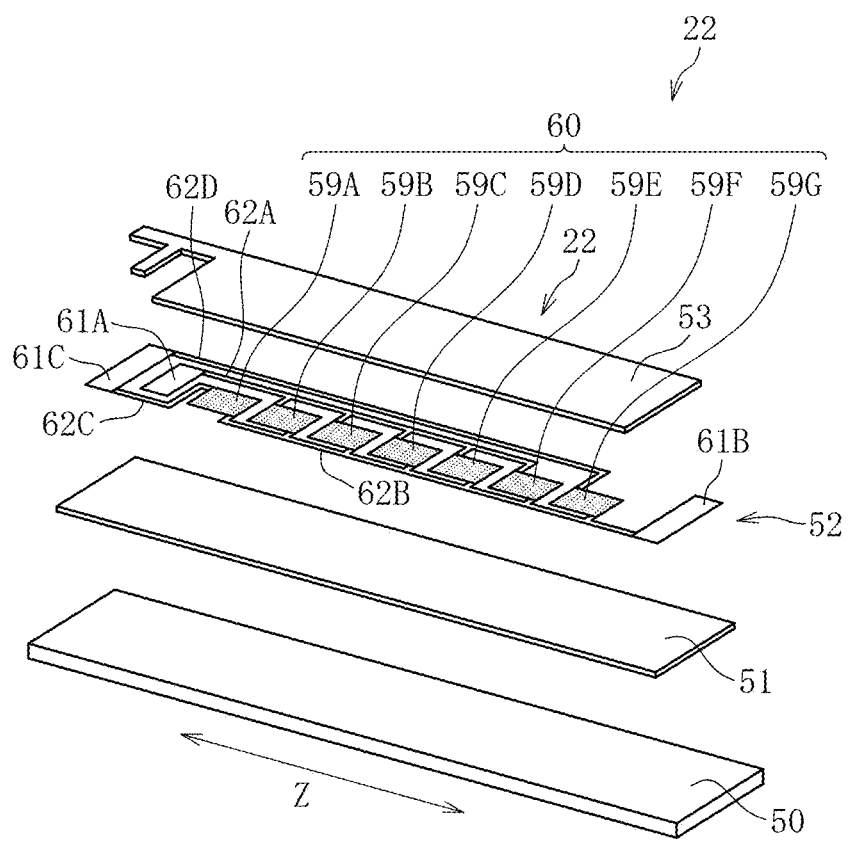
FIG. 8 is an exploded perspective view of the heater depicted in FIG. 7.

FIG. 7 is a plan view of the heater 22 according to this embodiment. FIG. 8 is an exploded perspective view of the heater 22.

As illustrated in FIG. 8, the heater 22 includes the conductor layer 52 that is mounted on the base 50 via the first insulating layer 51. The conductor layer 52 includes a plurality of resistive heat generators 59A, 59B, 59C, 59D, 59E, 59F, and 59G that constructs the heat generating portion 60, a plurality of electrodes 61A, 61B, and 61C, and a plurality of feeders 62A, 62B, 62C, and 62D (e.g., conductors). As illustrated in FIG. 7, the second insulating layer 53 covers an entirety of the plurality of resistive heat generators 59A, 59B, 59C, 59D, 59E, 59F, and 59G and most of the plurality of feeders 62A, 62B, 62C, and 62D to attain insulation. Conversely, the plurality of electrodes 61A, 61B, and 61C is coupled to a connector described below that is incorporated in the fixing device 9. Hence, the second insulating layer 53 barely covers the plurality of electrodes 61A, 61B, and 61C, exposing the electrodes 61A, 61B, and 61C.

Each of the resistive heat generators 59A, 59B, 59C, 59D, 59E, 59F, and 59G is produced as below. For example, silver-palladium (AgPd), glass powder, and the like are mixed into paste. The paste coats the base 50 by screen printing or the like. Thereafter, the base 50 is subject to firing. Alternatively, each of the resistive heat generators 59A, 59B, 59C, 59D, 59E, 59F, and 59G may be made of a resistive material such as a silver alloy (AgPt) and ruthenium oxide ($RuO_2$).

Each of the electrodes 61A, 61B, and 61C and the feeders 62A, 62B, 62C, and 62D is made of a conductor having a resistance value smaller than a resistance value of each of the resistive heat generators 59A, 59B, 59C, 59D, 59E, 59F, and 59G. For example, each of the electrodes 61A, 61B, and 61C and each of the feeders 62A, 62B, 62C, and 62D are produced by coating the base 50 with silver (Ag), silver-palladium (AgPd), or the like by screen printing.

According to this embodiment, the resistive heat generators 59A, 59B, 59C, 59D, 59E, 59F, and 59G are aligned in one line along a longitudinal direction Z of the base 50 with a gap between adjacent ones of the resistive heat generators 59A, 59B, 59C, 59D, 59E, 59F, and 59G. Hence, an insulating region (e.g., the second insulating layer 53) is interposed between the adjacent ones of the resistive heat generators 59A, 59B, 59C, 59D, 59E, 59F, and 59G. In the present disclosure, the longitudinal direction Z of the base 50 and the longitudinal direction of the heater 22 are parallel to the longitudinal direction of the fixing belt 20 and the axial direction of the pressure roller 21.

As illustrated in FIG. 7, two of the three, electrodes 61A, 61B, and 61C, that is, the electrodes 61A and 61C, are disposed in one lateral end span of the base 50, that is, a left side defined by a center c of the base 50, in the longitudinal direction Z thereof. Remaining one of the three, electrodes 61A, 61B, and 61C, that is, the electrode 61B, is disposed in another lateral end span of the base 50, that is, a right side defined by the center c of the base 50, in the longitudinal direction Z thereof. Each of the resistive heat generators 59A, 59B, 59C, 59D, 59E, 59F, and 59G is electrically connected to two of the plurality of electrodes 61A, 61B, and 61C. For example, among the seven, resistive heat generators 59A, 59B, 59C, 59D, 59E, 59F, and 59G, the resistive heat generators 59B, 59C, 59D, 59E, and 59F other than the resistive heat generators 59A and 59G disposed in both lateral end spans of the base 50 in the longitudinal direction Z thereof, respectively, are electrically connected in parallel to a first electrode, that is, the electrode 61A, through a first feeder, that is, the feeder 62A, and are electrically connected in parallel to a second electrode, that is, the electrode 61B, through a second feeder, that is, the feeder 62B. Conversely, the resistive heat generators 59A and 59G disposed in both lateral end spans of the base 50 in the longitudinal direction Z thereof, respectively, are electrically connected in parallel to a third electrode, that is, the electrode 61C, through a third feeder, that is, the feeder 62C, or a fourth feeder, that is, the feeder 62D, and are electrically connected in parallel to the second electrode, that is, the electrode 61B, through the second feeder, that is, the feeder 62B.

The heat generating portion 60 includes a first heat generating portion constructed of the resistive heat generators 59B, 59C, 59D, 59E, and 59F other than the resistive heat generators 59A and 59G disposed in both lateral end spans of the base 50 in the longitudinal direction Z thereof, respectively, and a second heat generating portion constructed of the resistive heat generators 59A and 59G disposed in both lateral end spans of the base 50 in the longitudinal direction Z thereof, respectively. With the connection described above, according to this embodiment, the controller controls the first heat generating portion and the second heat generating portion separately from each other to generate heat. For example, as a voltage is applied to the electrodes 61A and 61B to generate an electric potential difference between the electrodes 61A and 61B, the resistive heat generators 59B, 59C, 59D, 59E, and 59F, other than the resistive heat generators 59A and 59G disposed in both lateral end spans of the base 50 in the longitudinal direction Z thereof, respectively, are energized. Thus, the first heat generating portion generates heat. Conversely, as a voltage is applied to the electrodes 61C and 61B to generate an electric potential difference between the electrodes 61C and 61B, the resistive heat generators 59A and 59G disposed in both lateral end spans of the base 50 in the longitudinal direction Z thereof, respectively, are energized. Thus, the second heat generating portion generates heat. As a voltage is applied to the electrodes 61A, 61B, and 61C to generate an electric potential difference between the electrodes 61A and 61B and between the electrodes 61C and 61B, the resistive heat generators 59A, 59B, 59C, 59D, 59E, 59F, and 59G are energized. Thus, the first heat generating portion and the second heat generating portion generate heat. For example, when a small sheet having a width not greater than a width of 210 mm of an A4 size sheet is conveyed through the fixing device 9, the resistive heat generators 59B, 59C, 59D, 59E, and 59F that constrict the first heat generating portion and are other than the resistive heat generators 59A and 59G disposed in both lateral end spans of the base 50 in the longitudinal direction Z thereof, respectively, generate heat. When a large sheet having a width not smaller than a width of 297 mm of an A3 size sheet is conveyed through the fixing device 9, the resistive heat generators 59A, 59B, 59C, 59D, 59E, 59F, and 59G that construct the first heat generating portion and the second heat generating portion generate heat, thus achieving a plurality of heat generating regions corresponding to the widths of the small sheet and the large sheet, respectively.

Figure 9:
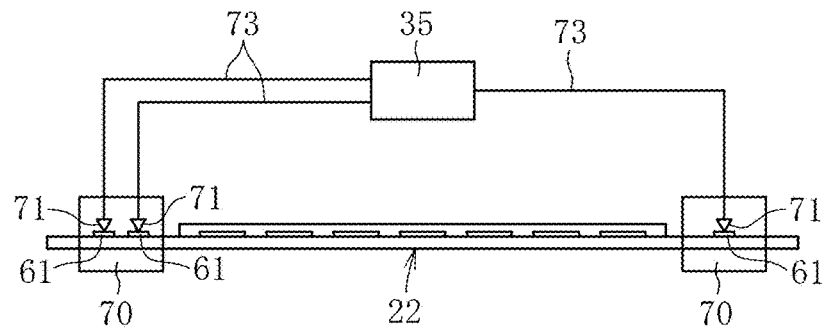
FIG. 9 is a schematic diagram of the heater depicted in FIG. 7 and a pair of connectors attached to the heater.

FIG. 9 is a schematic diagram of the heater 22 and a pair of connectors 70 attached to the heater 22. Each of the connectors 70 serves as a feeding member.

As illustrated in FIG. 9, as the pair of connectors 70 is attached to both lateral end spans of the heater 22 in the longitudinal direction thereof, respectively, a power supply 35 supplies power to the heater 22. As the connectors 70 are attached to both lateral end spans of the heater 22 in the longitudinal direction thereof, respectively, connector terminals 71 of the connectors 70 contact electrodes 61, that is, the electrodes 61A, 61B, and 61C depicted in FIG. 7, of the heater 22. Thus, the connector terminals 71 are electrically connected to the electrodes 61. The number of the connector terminals 71 of the connectors 70 are identical to the number of the electrodes 61 connected to the connector terminals 71. The connector 70 illustrated in a left part in FIG. 9 includes two connector terminals 71. The connector 70 illustrated in a right part in FIG. 9 includes one connector terminal 71. Each of the connector terminals 71 is coupled to a harness 73 (e.g., wire) that is coupled to the power supply 35 and supplies power. Accordingly, as the connector terminals 71 of the connectors 70 are electrically connected to the electrodes 61, the power supply 35 supplies power to the heater 22.

A description is provided of a construction of a comparative heater unit.

The comparative heater unit includes a heater including a platy base and resistive heat generators mounted on the base. The heater further includes an electrode mounted on the base. As a feeding member (e.g., a connector) is coupled to the electrode, power is supplied to the resistive heat generators. As the feeding member is not positioned with respect to the heater appropriately, the feeding member may not contact the electrode properly. To address this failure, a holder supports the heater and the feeding member.

In the comparative heater unit, the heater and the feeding member are supported by the holder that is separable from the heater and the feeding member. Accordingly, when the heater expands thermally and then shrinks as the temperature decreases, the holder may not suppress displacement of the feeding member relative to the heater effectively.

A detailed description is provided of a construction of the connector 70.

Figure 10:
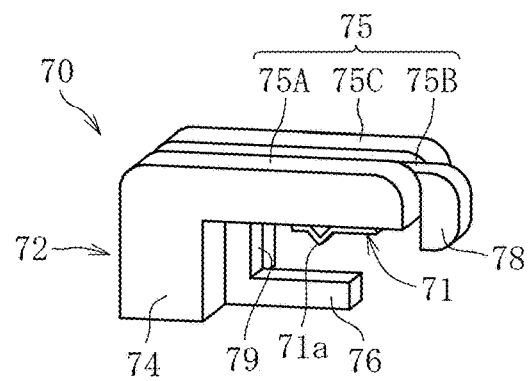
FIG. 10 is a perspective view of the connector according to a first embodiment of the present disclosure depicted in FIG. 9, seen in a first direction.
Figure 11:
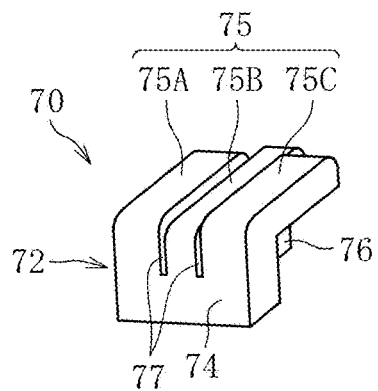
FIG. 11 is a perspective view of the connector according to the first embodiment depicted in FIG. 10, seen in a second direction different from the first direction.
Figure 12:
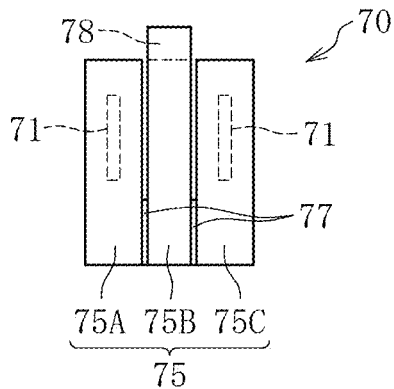
FIG. 12 is a plan view of the connector according to the first embodiment depicted in FIG. 11.

FIG. 10 is a perspective view of the connector 70 according to a first embodiment of the present disclosure, seen in a first direction. FIG. 11 is a perspective view of the connector 70 seen in a second direction different from the first direction. FIG. 12 is a plan view of the connector 70.

As illustrated in FIG. 10, the connector 70 according to the first embodiment includes the connector terminals 71 and a housing 72. The housing 72 is made of resin and serves as a terminal holder that holds or supports the connector terminals 71 or a restrictor that restricts displacement of the connector 70 relative to the heater 22. The connector terminal 71 is a conductive, resilient member that has conductivity and is resiliently deformable, such as a flat spring. At least a part of the connector terminal 71 is exposed from the housing 72. An exposed part of the connector terminal 71 includes a contact portion 71a that is triangular and in contact with the electrode 61 of the heater 22.

The housing 72 includes a base 74, a first arm 75, and a second arm 76. The first arm 75 and the second arm 76 extend from the base 74 in an identical direction. As illustrated in FIGS. 11 and 12, the first arm 75 is divided into three parts, that is, divided arms 75A, 75B, and 75C, with two slits 77 interposed between the divided arms 75A and 75B and between the divided arms 75B and 75C, respectively. Among three divided arms, that is, the divided arms 75A, 75B, and 75C, as illustrated in FIG. 12, the divided arms 75A and 75C disposed at both ends of the first arm 75, respectively, mount the connector terminals 71. In another connector, that is, the connector 70 including one connector terminal 71, among the divided arms 75A and 75C disposed at both ends of the first arm 75, respectively, one of the divided arms 75A and 75C, that does not mount the connector terminal 71, may be omitted.

As illustrated in FIG. 10, a tip of the divided arm 75B, that is, a center arm disposed at a center of the first arm 75, mounts an engaging pawl 78 serving as an engaging portion that engages the heater 22. The base 74 mounts an engaging projection 79 serving as an engaging portion that engages the heater 22. The engaging projection 79 projects from the base 74 and is interposed between the divided arm 75B, as the center arm among the three, divided arms 75A, 75B, and 75C, and the second arm 76 disposed opposite the divided arm 75B.

Figure 13:
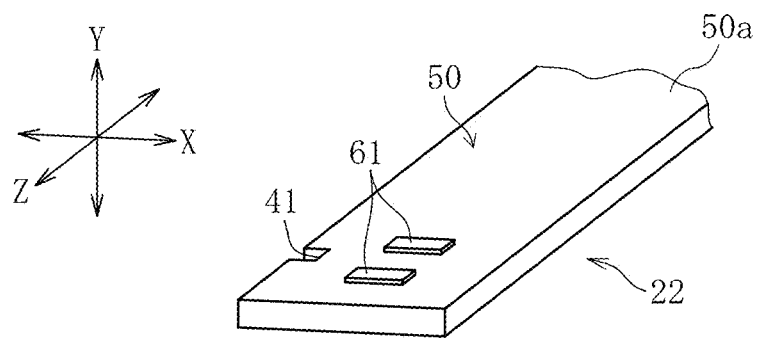
FIG. 13 is a perspective view of the heater according to the first embodiment depicted in FIG. 9.

FIG. 13 is a perspective view of the heater 22 according to the first embodiment of the present disclosure.

As illustrated in FIG. 13, the heater 22 according to the first embodiment includes an engaged recess 41 that is disposed in one lateral end span of the base 50 in the longitudinal direction Z thereof. The engaged recess 41 serves as an engaged portion that engages the engaging projection 79 of the connector 70. The base 50 of the heater 22 includes an electrode mounting face 50a that mounts the electrodes 61. A thickness direction Y defines a direction perpendicular to the electrode mounting face 50a. A width direction X defines a direction perpendicular to the longitudinal direction Z and the thickness direction Y of the base 50. The engaged recess 41 is disposed at one end (e.g., one edge) of the base 50 in the width direction X thereof.

A description is provided of a method for attaching the connector 70 to the heater 22 by taking the connector 70 having the two connector terminals 71 as an example.

A description of a method for attaching the connector 70 having the single connector terminal 71 to the heater 22 is omitted because the method is basically equivalent to the method for attaching the connector 70 having the two connector terminals 71 to the heater 22.

Figure 14:
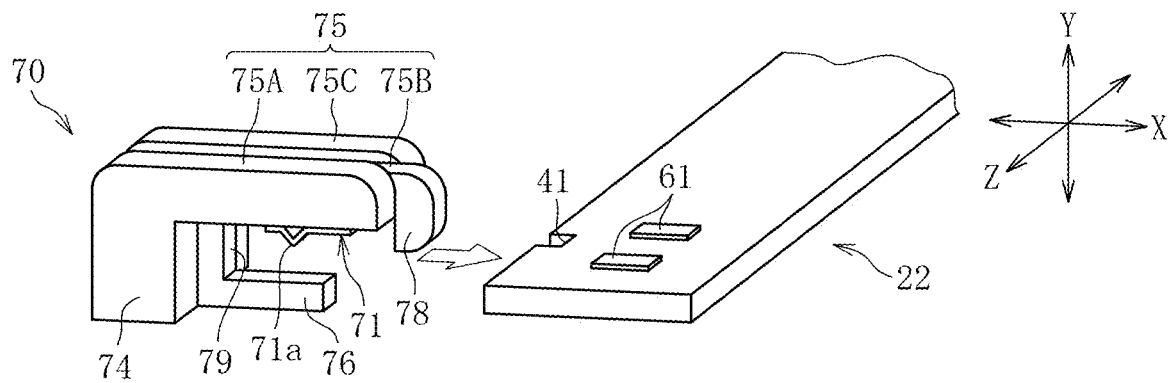
FIG. 14 is a perspective view of the heater depicted in FIG. 13 and the connector depicted in FIG. 10, illustrating a first process of a method for attaching the connector to the heater.

In order to attach the connector 70 to the heater 22 according to this embodiment, first, as illustrated in FIG. 14, the connector 70 is moved closer to a connector attachment position in the width direction X. The connector attachment position is disposed in one lateral end span of the heater 22 in the longitudinal direction Z thereof. The engaged recess 41 of the heater 22 is directed to the connector 70.

Figure 15:
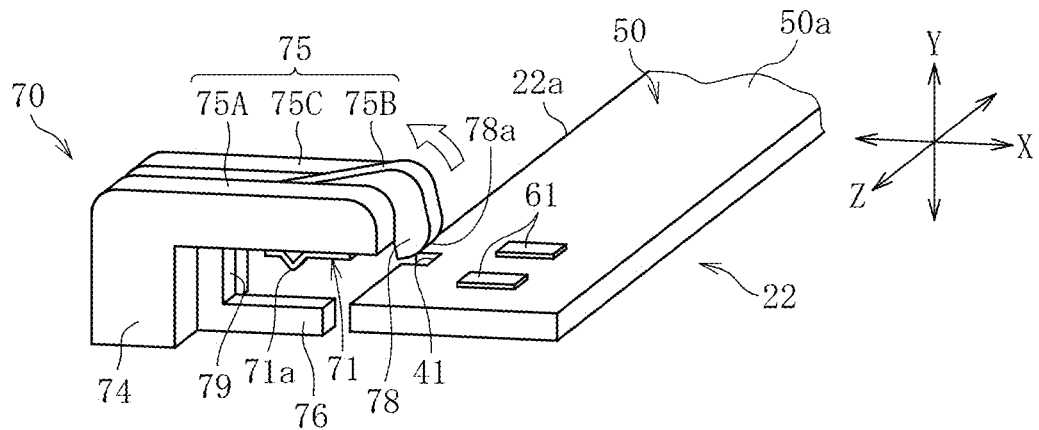
FIG. 15 is a perspective view of the heater and the connector depicted in FIG. 14, illustrating a second process of the method for attaching the connector to the heater.

As illustrated in FIG. 15, as the connector 70 is moved closer to the heater 22, a slope 78a disposed on a tip of the engaging pawl 78 comes into contact with an edge face 22a in the width direction X or the engaged recess 41 of the heater 22. The edge face 22a is a front edge face or one edge face of the heater 22 in a connector attachment direction in which the connector 70 is attached to the heater 22. The edge face 22a or the engaged recess 41 lifts the engaging pawl 78 upward in FIG. 15 while the divided arm 75B is deformed resiliently. According to this embodiment, the divided arm 75B mounting the engaging pawl 78 serves as a deforming portion that deforms resiliently in the thickness direction Y of the heater 22. Accordingly, the engaging pawl 78 is lifted smoothly and placed on the electrode mounting face 50a of the base 50 of the heater 22 smoothly.

Figure 16:
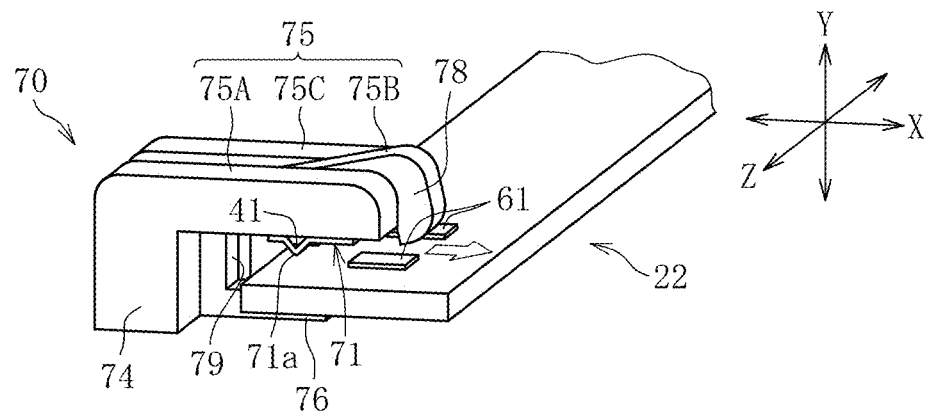
FIG. 16 is a perspective view of the heater and the connector depicted in FIG. 14, illustrating a third process of the method for attaching the connector to the heater.
Figure 17:
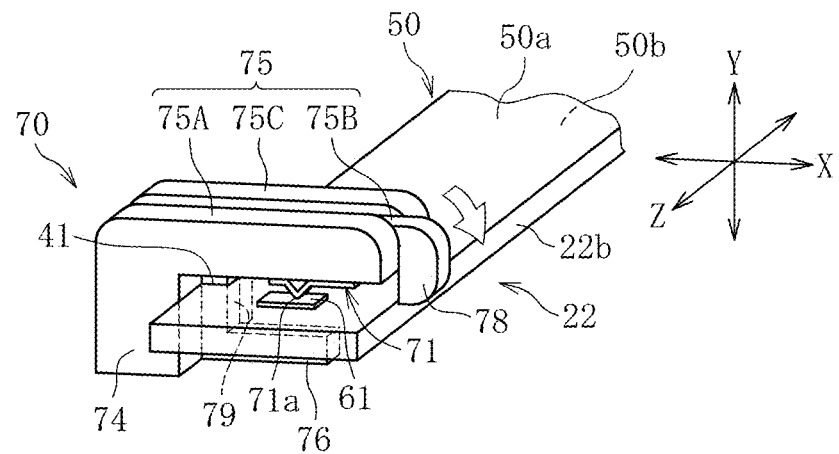
FIG. 17 is a perspective view of the heater and the connector depicted in FIG. 14, illustrating a fourth process of the method for attaching the connector to the heater.
Figure 18:
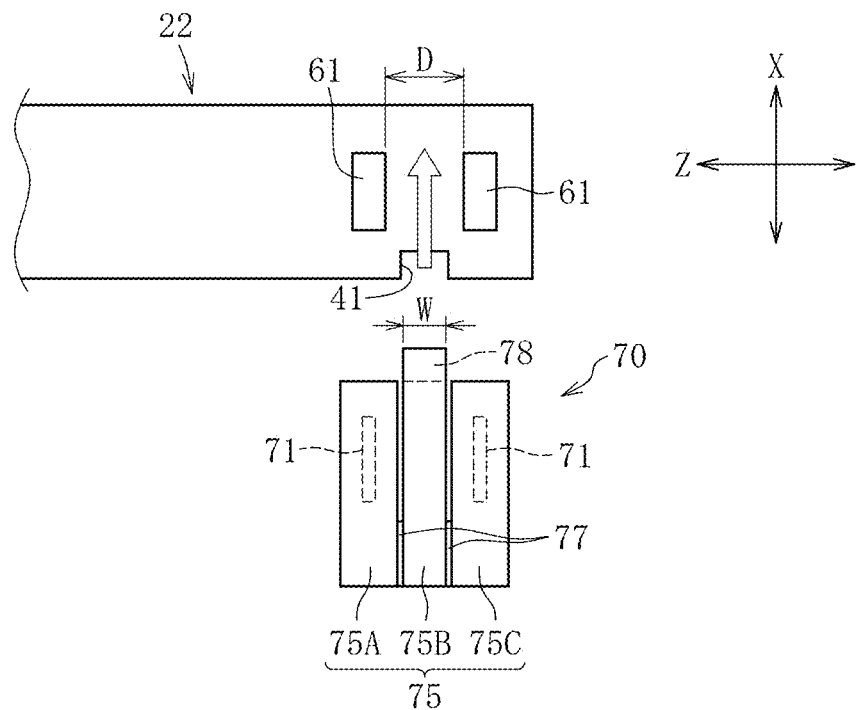
FIG. 18 is a plan view of the heater and the connector depicted in FIG. 14.

As illustrated in FIG. 16, while the engaging pawl 78 of the connector 70 slides over the heater 22, the engaging pawl 78 passes through a gap between the two electrodes 61. In order to prevent the engaging pawl 78 from coming into contact with and damaging the electrodes 61, the gap is provided between the two electrodes 61 so that the engaging pawl 78 passes through the gap without contacting the electrodes 61 as illustrated in FIGS. 15, 16, and 17. For example, as illustrated in FIG. 18, a gap D between the electrodes 61 is greater than a width W of a contact span where the engaging pawl 78 contacts the heater 22.

As illustrated in FIG. 17, as the engaging pawl 78 reaches an edge face 22b, that is, another edge face of the heater 22 in the width direction X thereof or a rear edge face of the heater 22 in the connector attachment direction in which the connector 70 is attached to the heater 22, the divided arm 75B disposed at the center of the first arm 75 recovers resiliently and presses down the engaging pawl 78 in FIG. 17. Accordingly, the engaging pawl 78 engages the edge face 22b, that is, another edge face of the heater 22 in the width direction X thereof. For example, the engaging pawl 78 is in contact with the edge face 22b of the heater 22 or is disposed opposite the edge face 22b of the heater 22 with a slight gap therebetween. Accordingly, displacement of the connector 70 relative to the heater 22 is restricted unidirectionally in one direction of the width direction X of the heater 22, finishing attachment of the connector 70 to the heater 22.

In a state in which attachment of the connector 70 to the heater 22 is finished, as illustrated in FIG. 17, as the engaging projection 79 of the connector 70 is inserted into the engaged recess 41 of the heater 22, the engaging projection 79 engages the engaged recess 41 in another direction of the width direction X (e.g., a direction opposite the one direction of the width direction X described above) and bidirectionally in the longitudinal direction Z of the heater 22. Accordingly, displacement of the connector 70 relative to the heater 22 is restricted in another direction of the width direction X and bidirectionally in the longitudinal direction Z of the heater 22.

Additionally, in the state in which attachment of the connector 70 to the heater 22 is finished as illustrated in FIG. 17, as the connector terminals 71 of the connector 70 are resiliently contacted by or pressed against the electrodes 61 of the heater 22, that are disposed opposite the connector terminals 71, respectively, the connector terminals 71 are electrically connected to the electrodes 61, respectively. As the connector terminals 71 apply a bias to the heater 22 in the thickness direction Y thereof in this state, the heater 22 is pressed against the second arm 76. As the second arm 76 receives the bias from the connector terminals 71, the second arm 76 serves as a support that supports an opposite face 50b opposite the electrode mounting face 50a of the base 50 of the heater 22. Accordingly, the second arm 76 and the connector terminals 71 sandwich the heater 22 in the thickness direction Y thereof, restricting displacement of the connector 70 relative to the heater 22 bidirectionally in the thickness direction Y thereof.

As described above, according to this embodiment, in a state in which the connector 70 is attached to the heater 22, displacement of the connector 70 relative to the heater 22 is restricted bidirectionally in each of the longitudinal direction Z, the width direction X, and the thickness direction Y of the heater 22. Accordingly, shifting of the connector 70 from the heater 22 is suppressed precisely. Additionally, the connector 70 engages the heater 22 without a separate member that is separable from the connector 70 and the heater 22 and is interposed between the connector 70 and the heater 22. Hence, even if the heater 22 thermally expands due to heat generation and then shrinks due to temperature decrease, the connector 70 moves properly in accordance with displacement of the heater 22 without interference from an interposed member that is interposed between the heater 22 and the connector 70. As described above, the constructions of the heater 22 and the connector 70 according to this embodiment suppress displacement of the connector 70 relative to the heater 22 effectively, decreasing abrasion of the electrodes 61, that is caused by displacement (e.g., sliding) of the connector terminals 71, effectively, and retaining conductivity from the connector terminals 71 to the electrodes 61 properly for an extended period of time.

Figure 19:
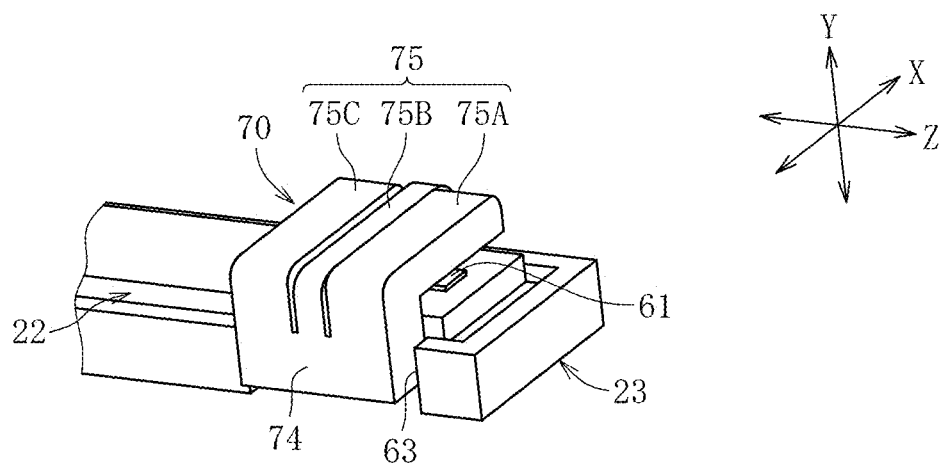
FIG. 19 is a perspective view of the heater depicted in FIG. 18 and a heater holder that is incorporated in the fixing device depicted in FIG. 2 and supports the heater, seen in a first direction.
Figure 20:
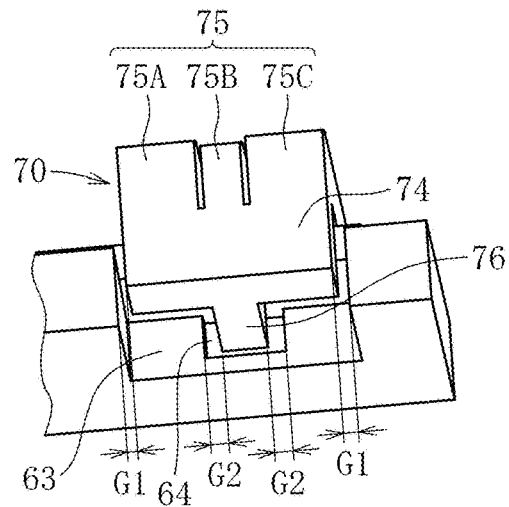
FIG. 20 is a perspective view of the heater and the heater holder depicted in FIG. 19, seen in a second direction different from the first direction.

FIG. 19 is a perspective view of the heater 22 according to this embodiment and the heater holder 23 that supports the heater 22 in a state in which the connector 70 is attached to the heater 22, seen in a first direction. FIG. 20 is a perspective view of the connector 70, seen in a second direction different from the first direction.

As illustrated in FIGS. 19 and 20, according to this embodiment, in a state in which the heater holder 23 supports the heater 22, the connector 70 does not engage the heater holder 23. For example, according to this embodiment, the heater holder 23 includes recesses 63 and 64 that are disposed opposite the connector 70, preventing the connector 70 from engaging the heater holder 23. Accordingly, even if the heater 22 thermally expands and shrinks, the connector 70 moves precisely in accordance with displacement of the heater 22 without being restrained by the heater holder 23. Additionally, according to this embodiment, the recesses 63 and 64 of the heater holder 23 have an opening through which the connector 70 is attached to the heater 22. The opening is situated at a front side in FIG. 19. The connector 70 may be attached to the heater 22 after the heater 22 is attached to the heater holder 23.

While the heater holder 23 supports the heater 22 as illustrated in FIG. 19, a gap between an opposed face of the connector 70 and an opposed face of the heater holder 23, that is disposed opposite the opposed face of the connector 70, is preferably greater than a maximum displacement amount of the heater 22 due to thermal expansion from a non-heat generation state in which the heater 22 does not generate heat at an ambient temperature, for example, to a predetermined heat generation state in which the heater 22 has a fixing temperature, for example. Displacement of the heater 22 due to thermal expansion is noticeable in the longitudinal direction Z of the heater 22. Hence, as illustrated in FIG. 20, each of a gap G1 and a gap G2 is preferably greater than the maximum displacement amount of the heater 22 due to thermal expansion from the non-heat generation state in which the heater 22 does not generate heat to the predetermined heat generation state in which the heater 22 generates heat. The gap G1 is provided between an opposed face of the base 74 of the connector 70 and an opposed face of the recess 63 accommodating the base 74, that is disposed opposite the opposed face of the base 74, in the longitudinal direction Z of the heater 22. The gap G2 is provided between an opposed face of the second arm 76 of the connector 70 and an opposed face of the recess 64 accommodating the second arm 76, that is disposed opposite the opposed face of the second arm 76, in the longitudinal direction Z of the heater 22. Accordingly, even if the heater 22 is displaced due to temperature increase, the connector 70 moves precisely in accordance with displacement of the heater 22 without interference by the heater holder 23. The above-described configuration in which the gaps G1 and G2 are provided between the heater holder 23 and the connector 70 is not limited to a relation between the heater holder 23 and the connector 70 and is preferably established similarly also in a relation between the connector 70 and a member other than the heater holder 23 (e.g., a member other than the heater 22 and the connector 70).

Figure 21:
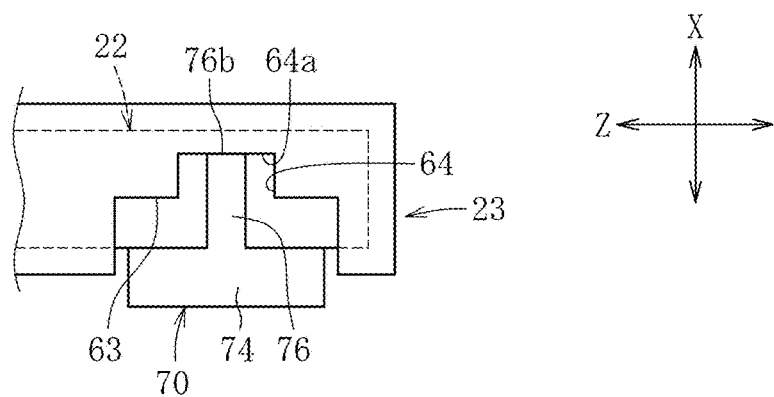
FIG. 21 is a diagram of the heater holder depicted in FIG. 19, that is partially contacted by the connector depicted in FIG. 10.

The connector 70 preferably does not contact other member such as the heater holder 23. If contact of the connector 70 with other member does not restrict motion of the connector 70 in accordance with displacement of the heater 22, the connector 70 may partially contact other member. For example, as illustrated in FIG. 21, even if a tip face 76b of the second arm 76 of the connector 70 contacts an opposed face 64a of the heater holder 23, that is disposed opposite the tip face 76b, contact of the tip face 76b with the opposed face 64a is allowable as long as the contact does not restrict displacement of the connector 70 relative to the heater holder 23. In this case, even if the connector 70 is displaced in the longitudinal direction Z of the heater 22 as the heater 22 thermally expands, the tip face 76b of the second arm 76 slides over the opposed face 64a of the heater holder 23 in the longitudinal direction Z of the heater 22. Accordingly, the connector 70 moves in accordance with displacement of the heater 22 due to thermal expansion without receiving a substantial resistance from the heater holder 23.

A description is provided of embodiments that are different from the first embodiment described above.

Hereinafter, the embodiments are described mainly of configurations that are different from those of the first embodiment described above. A description of other configurations that are basically common to the first embodiment described above is omitted.

Figure 22:
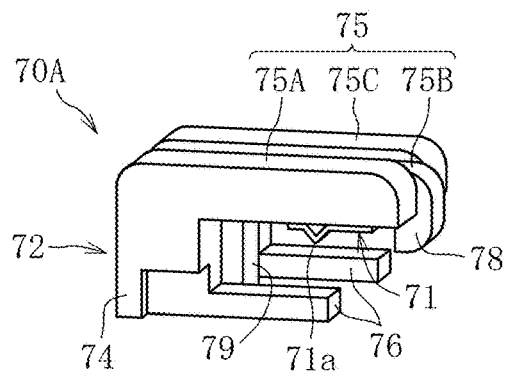
FIG. 22 is a perspective view of a connector according to a second embodiment of the present disclosure, that is installable in the fixing device depicted in FIG. 2, seen in a first direction.
Figure 23:
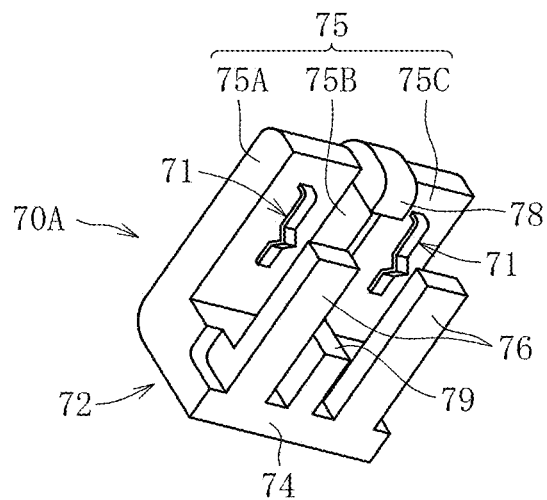
FIG. 23 is a perspective view of the connector according to the second embodiment depicted in FIG. 22, seen in a second direction different from the first direction.

FIG. 22 is a perspective view of a connector 70A according to a second embodiment of the present disclosure, seen in a first direction. FIG. 23 is a perspective view of the connector 70A, seen in a second direction different from the first direction.

As illustrated in FIGS. 22 and 23, the connector 70A according to the second embodiment is different from the connector 70 according to the first embodiment in a configuration that the connector 70A includes two second arms 76. The second arms 76 are disposed opposite the divided arms 75A and 75C disposed at both ends of the first arm 75, respectively.

Figure 24:
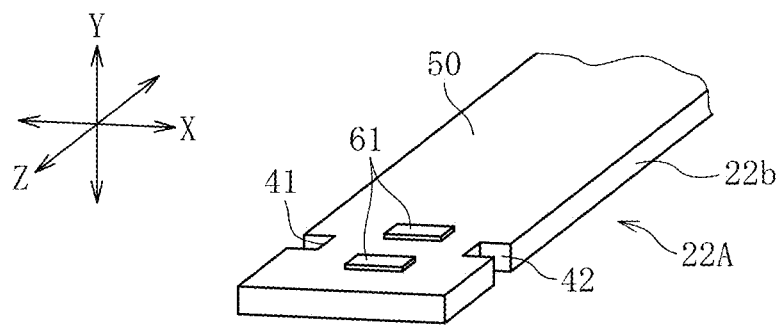
FIG. 24 is a perspective view of a heater according to the second embodiment, that is installable in the fixing device depicted in FIG. 2.

FIG. 24 is a perspective view of a heater 22A according to the second embodiment of the present disclosure.

As illustrated in FIG. 24, the heater 22A according to the second embodiment is different from the heater 22 according to the first embodiment in a configuration that the heater 22A includes the engaged recess 41 and an engaged recess 42 that are disposed at both ends of the base 50 in the width direction X thereof, respectively. The engaged recesses 41 and 42 serve as engaged portions, respectively. Other configurations of the heater 22A according to the second embodiment are basically equivalent to those of the heater 22 according to the first embodiment.

Figure 25:
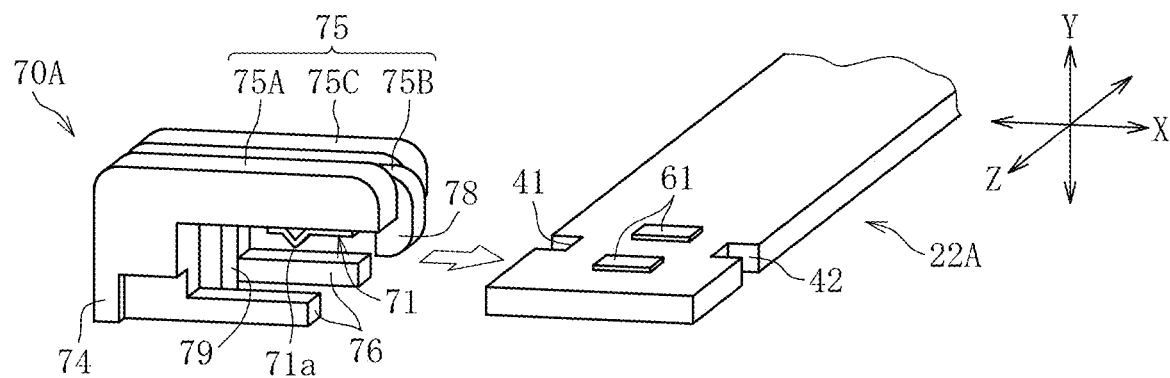
FIG. 25 is a perspective view of the heater depicted in FIG. 24 and the connector depicted in FIG. 22, illustrating a first process of a method for attaching the connector to the heater.

In order to attach the connector 70A to the heater 22A according to the second embodiment, as illustrated in FIG. 25, like the connector 70 and the heater 22 according to the first embodiment described above, the connector 70A is moved closer to the heater 22A in the width direction X thereof.

Figure 26:
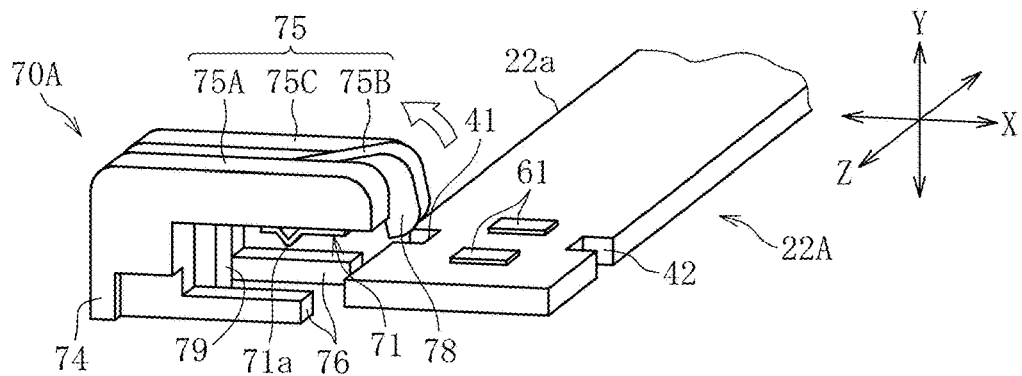
FIG. 26 is a perspective view of the heater and the connector depicted in FIG. 25, illustrating a second process of the method for attaching the connector to the heater.

As illustrated in FIG. 26, as the connector 70A is moved closer to the heater 22A, the engaging pawl 78 of the connector 70A comes into contact with the edge face 22a of the heater 22A in the width direction X thereof (e.g., a front edge face or one edge face of the heater 22A in a connector attachment direction in which the connector 70A is attached to the heater 22A) or the engaged recess 41. The edge face 22a or the engaged recess 41 lifts the engaging pawl 78 while the divided arm 75B disposed at the center of the first arm 75 is deformed resiliently.

Figure 27:
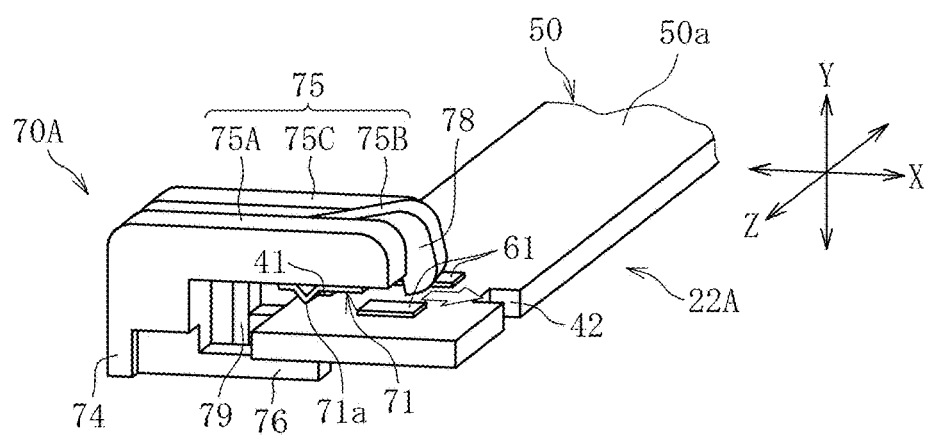
FIG. 27 is a perspective view of the heater and the connector depicted in FIG. 25, illustrating a third process of the method for attaching the connector to the heater.
Figure 28:
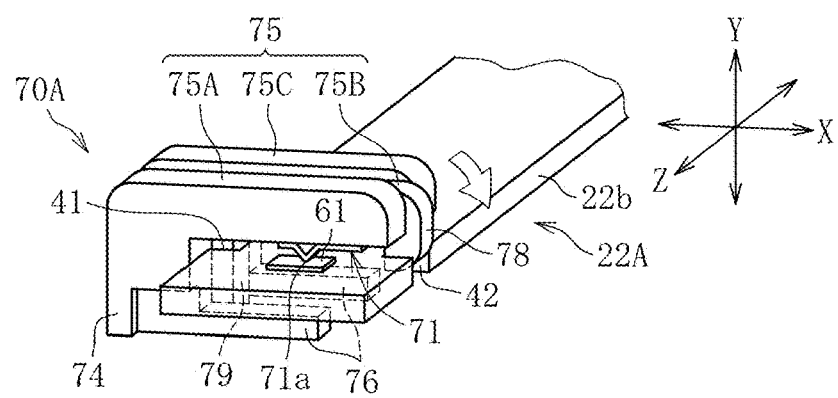
FIG. 28 is a perspective view of the heater and the connector depicted in FIG. 25, illustrating a fourth process of the method for attaching the connector to the heater.

As the engaging pawl 78 slides over the electrode mounting face 50a of the base 50 of the heater 22A as illustrated in FIG. 27 and the engaging pawl 78 reaches the engaged recess 42 disposed on the edge face 22b (e.g., a rear edge face or another edge face of the heater 22A in the connector attachment direction in which the connector 70A is attached to the heater 22A) of the heater 22A in the width direction X thereof as illustrated in FIG. 28, the divided arm 75B disposed at the center of the first arm 75 recovers resiliently and presses down the engaging pawl 78 in FIG. 28. Accordingly, the engaging pawl 78 engages the engaged recess 42 unidirectionally in the width direction X and bidirectionally in the longitudinal direction Z of the heater 22A, thus finishing attachment of the connector 70A to the heater 22A.

In a state in which attachment of the connector 70A to the heater 22A is finished, as illustrated in FIG. 28, the engaging projection 79 is inserted into and engaged with the engaged recess 41. Accordingly, the second arms 76 and the connector terminals 71 sandwich the heater 22A in the thickness direction V thereof. Consequently, displacement of the connector 70A relative to the heater 22A is restricted bidirectionally in each of the longitudinal direction Z, the width direction X, and the thickness direction Y of the heater 22A.

As described above, with the heater 22A and the connector 70A according to the second embodiment also, displacement of the connector 70A relative to the heater 22A is restricted bidirectionally in each of the longitudinal direction Z, the width direction X, and the thickness direction Y of the heater 22A, preventing the connector 70A from shifting from the heater 22A precisely. Additionally, with the heater 22A and the connector 70A according to the second embodiment also, the connector 70A engages the heater 22A without the separate member that is separable from the connector 70A and the heater 22A and is interposed between the connector 70A and the heater 22A. Accordingly, displacement of the connector 70A relative to the heater 22A is suppressed effectively, decreasing abrasion of the electrodes 61 effectively.

Additionally, with the heater 22A and the connector 70A according to the second embodiment, the engaging projection 79 and the engaging pawl 78 of the connector 70A engage the engaged recesses 41 and 42 of the heater 22A, respectively, preventing the connector 70A from shifting from the heater 22A in the longitudinal direction Z thereof precisely at both ends of the heater 22A in the width direction X thereof. Accordingly, the connector 70A is not positioned with respect to the heater 22A erroneously at one end of the heater 22A in the width direction X thereof, suppressing torsion of the connector 70A and retaining accuracy of positioning of the heater 22A with respect to the connector 70A more precisely.

Further, with the heater 22A and the connector 70A according to the second embodiment, the two second arms 76 support the heater 22A. The second arms 76 support the heater 22A at opposed positions where the second arms 76 are disposed opposite the connector terminals 71 that bias the heater 22A, respectively, attaining a stable posture of the heater 22A and retaining contact of the connector terminals 71 with the electrodes 61 more precisely.

Figure 29:
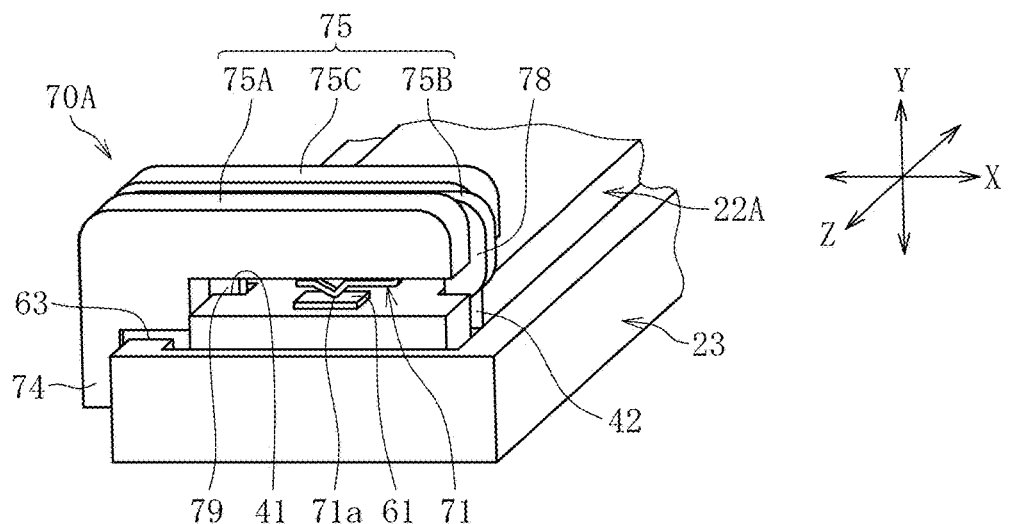
FIG. 29 is a perspective view of the heater depicted in FIG. 28 and the heater holder depicted in FIG. 19 that supports the heater.

FIG. 29 is a perspective view of the heater 22A according to the second embodiment, that is supported by the heater holder 23.

The heater holder 23 includes the recess 63 that prevents interference with the connector 70A according to the second embodiment also. For example, while the heater holder 23 supports the heater 22A, the connector 70A does not engage the heater holder 23. Accordingly, the connector 70A according to the second embodiment also moves precisely in accordance with displacement of the heater 22A without being restrained by the heater holder 23.

Figure 30:
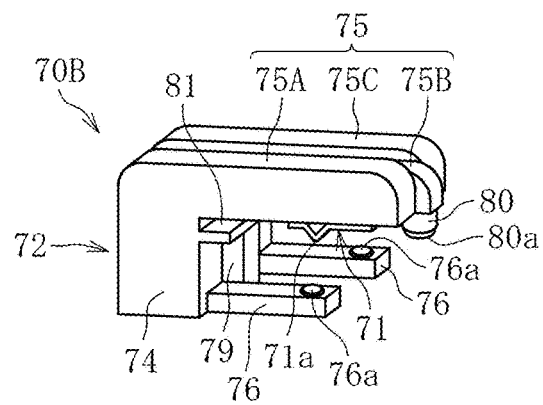
FIG. 30 is a perspective view of a connector according to a third embodiment of the present disclosure that is installable in the fixing device depicted in FIG. 2.
Figure 31:
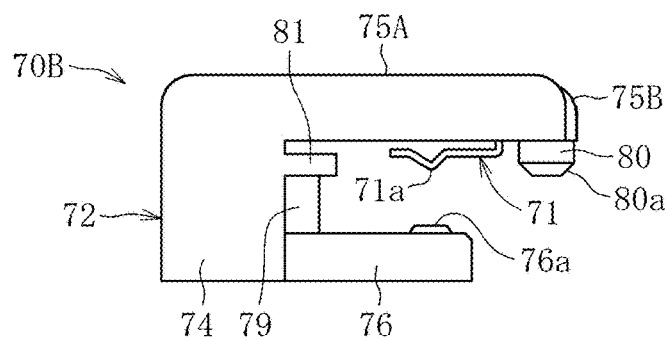
FIG. 31 is a side view of the connector according to the third embodiment depicted in FIG. 30.

FIG. 30 is a perspective view of a connector 70B according to a third embodiment of the present disclosure. FIG. 31 is a side view of the connector 70B according to the third embodiment.

As illustrated in FIGS. 30 and 31, the connector 70B according to the third embodiment includes an engaging projection 80 instead of the engaging pawl 78. The engaging projection 80 is mounted on the tip of the divided arm 75B, that is, the center arm disposed at the center of the first arm 75. The engaging projection 80 serves as an engaging portion and has a circular truncated cone shape. The engaging projection 80 includes a slope 80a that is tapered and has a diameter that decreases toward a tip of the engaging projection 80 in a projection direction in which the engaging projection 80 projects from the divided arm 75B. Alternatively, instead of being conical, the slope 80a may be planar such as a square pyramid.

As illustrated in FIGS. 30 and 31, the connector 70B according to the third embodiment includes a presser 81 that is interposed between the first arm 75 and the second arms 76 and presses the heater 22A against the second arms 76. Each of the pair of second arms 76 mounts a supporting projection 76a serving as a support that supports the heater 22A.

Figure 32:
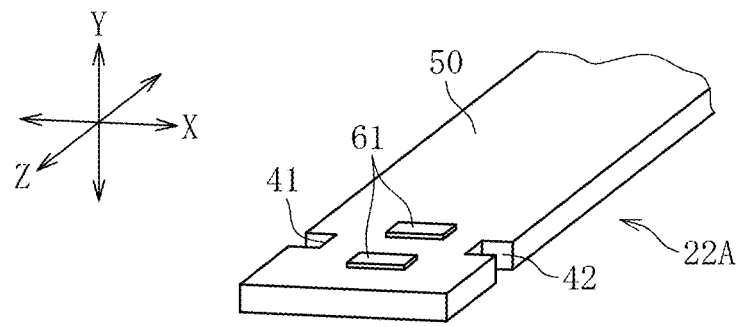
FIG. 32 is a perspective view of a heater according to the third embodiment, that is installable in the fixing device depicted in FIG. 2.

FIG. 32 is a perspective view of the heater 22A according to the third embodiment of the present disclosure.

As illustrated in FIG. 32, the heater 22A according to the third embodiment has a configuration that is equivalent to the configuration of the heater 22A according to the second embodiment depicted in FIG. 24. The engaged recesses 41 and 42, serving as the engaged portions, respectively, are disposed at both ends of the base 50 in the width direction X thereof.

Figure 33:
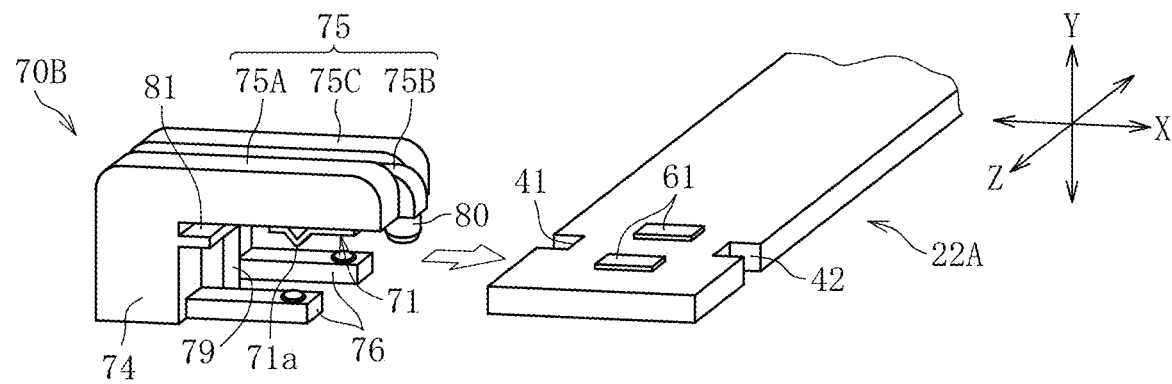
FIG. 33 is a perspective view of the heater depicted in FIG. 32 and the connector depicted in FIG. 31, illustrating a first process of a method for attaching the connector to the heater.

In order to attach the connector 70B according to the third embodiment to the heater 22A, as illustrated in FIG. 33, like the heater 22A according to the second embodiment, the connector 70B is moved closer to the heater 22A in the width direction X thereof.

Figure 34:
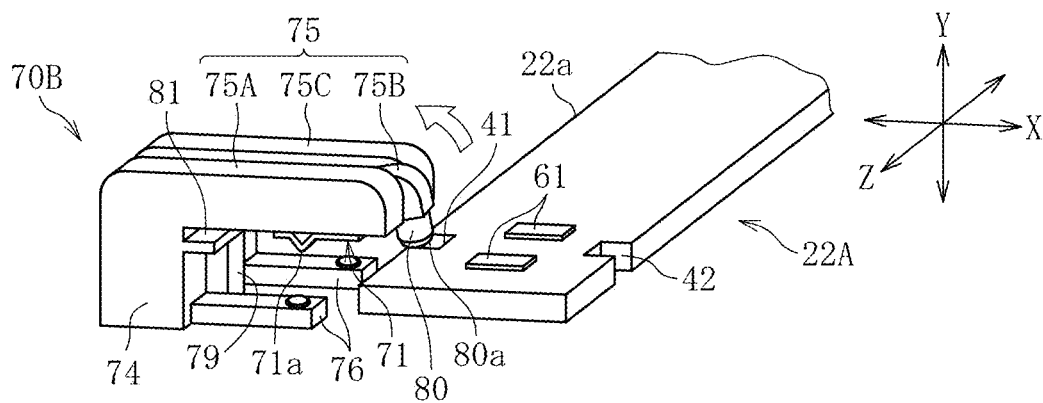
FIG. 34 is a perspective view of the heater and the connector depicted in FIG. 33, illustrating a second process of the method for attaching the connector to the heater.

As illustrated in FIG. 34, as the connector 70B is moved closer to the heater 22A, the engaging projection 80 of the connector 70B comes into contact with the edge face 22a of the heater 22A in the width direction X thereof (e.g., the front edge face or one edge face of the heater 22A in a connector attachment direction in which the connector 70B is attached to the heater 22A) or the engaged recess 41. The edge face 22a or the engaged recess 41 lifts the engaging projection 80 while the divided arm 75B disposed at the center of the first arm 75 is deformed resiliently. Since the engaging projection 80 includes the slope 80a that is tapered, the engaging projection 80 is lifted smoothly.

Figure 35:
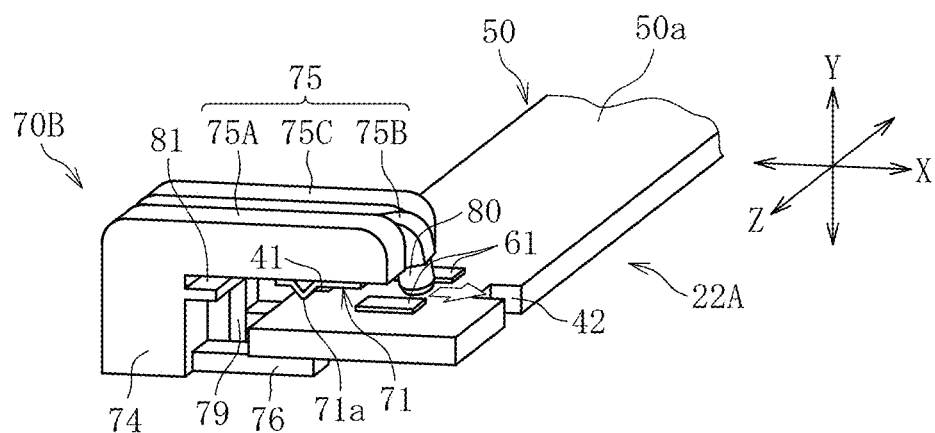
FIG. 35 is a perspective view of the heater and the connector depicted in FIG. 33, illustrating a third process of the method for attaching the connector to the heater.
Figure 36:
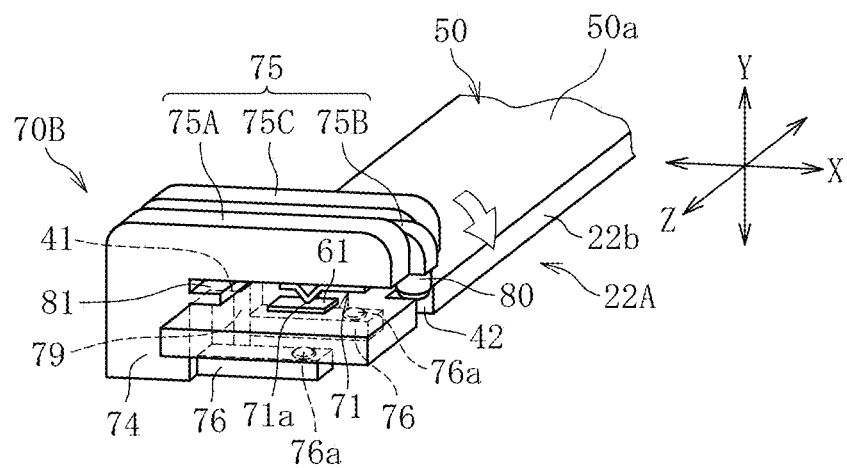
FIG. 36 is a perspective view of the heater and the connector depicted in FIG. 33, illustrating a fourth process of the method for attaching the connector to the heater.

As the engaging projection 80 slides over the electrode mounting face 50a of the base 50 of the heater 22A as illustrated in FIG. 35 and the engaging projection 80 reaches the engaged recess 42 disposed on the edge face 22B (e.g., the rear edge face or another edge face of the heater 22A in the connector attachment direction in which the connector 70B is attached to the heater 22A) of the heater 22A in the width direction X thereof as illustrated in FIG. 36, the divided arm 75B disposed at the center of the first arm 75 recovers resiliently and presses down the engaging projection 80 in FIG. 36. Thus, the engaging projection 80 engages an edge of the engaged recess 42, finishing attachment of the connector 70B to the heater 22A.

In a state in which attachment of the connector 70B to the heater 22A is finished, as illustrated in FIG. 36, the engaging projection 80 engages the edge of the engaged recess 42, restricting displacement of the connector 70B relative to the heater 22A unidirectionally in the width direction X and bidirectionally in the longitudinal direction Z of the heater 22A. Since the engaging projection 80 includes the slope 80a depicted in FIG. 31 that is tapered and disposed at the tip of the engaging projection 80, the engaging projection 80 contacts the engaged recess 42 in an increased area, attaining stable engagement of the engaging projection 80 with the engaged recess 42. As illustrated in FIG. 36, the engaged recess 42 is rectangular. Alternatively, the engaged recess 42 may be circular or may have other shapes. Instead of the slope 80a of the engaging projection 80, the edge of the engaged recess 42 may mount a slope that engages the engaging projection 80.

As illustrated in FIG. 36, in a state in which attachment of the connector 70B to the heater 22A is finished, like the connector 70 according to the first embodiment and the connector 70A according to the second embodiment, the engaging projection 79, that is, another engaging projection, is inserted into and engaged with the engaged recess 41 that is disposed opposite the engaging projection 79. Additionally, the connector terminals 71 and the second arms 76 sandwich the heater 22A in the thickness direction Y thereof. Accordingly, displacement of the connector 70B relative to the heater 22A is restricted bidirectionally in each of the longitudinal direction Z, the width direction X, and the thickness direction Y of the heater 22A.

As described above, with the heater 22A and the connector 70B according to the third embodiment also, displacement of the connector 70B relative to the heater 22A is restricted bidirectionally in each of the longitudinal direction Z, the width direction X, and the thickness direction Y of the heater 22A. Accordingly, shifting of the connector 70B from the heater 22A is suppressed effectively. Like the connector 70 according to the first embodiment and the connector 70A according to the second embodiment, the connector 70B engages the heater 22A without the separate member that is separable from the connector 70B and the heater 22A and is interposed between the connector 70B and the heater 22A. Accordingly, displacement of the connector 70B relative to the heater 22A is suppressed effectively, decreasing abrasion of the electrodes 61.

With the heater 22A and the connector 70B according to the third embodiment, in addition to the advantages described above, in a state in which attachment of the connector 70B to the heater 22A is finished as illustrated in FIG. 36, the presser 81 of the connector 70B contacts the electrode mounting face 50a of the base 50 of the heater 22A, holding the heater 22A stably. Further, with the heater 22A and the connector 70B according to the third embodiment, the supporting projections 76a of the second arms 76 support the heater 22A at opposed positions where the second arms 76 are disposed opposite the connector terminals 71, respectively, in the thickness direction Y of the heater 22A, thus attaining a stabler posture of the heater 22A.

Figure 37:
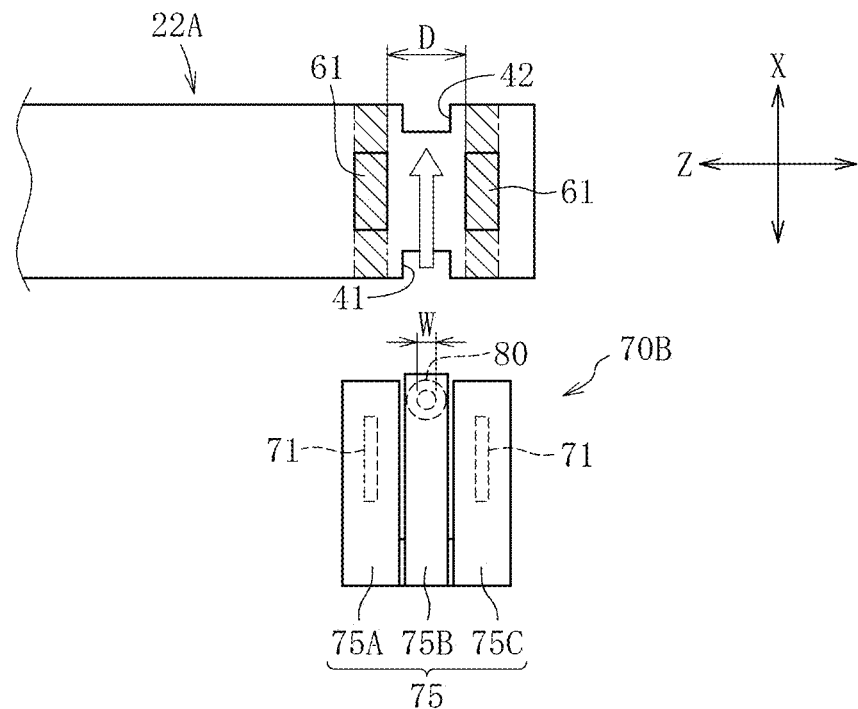
FIG. 37 is a plan view of the healer and the connector depicted in FIG. 33.

Additionally, with the heater 22A and the connector 70B according to the third embodiment, like the engaging pawl 78, the engaging projection 80 of the connector 70B does not preferably contact the electrodes 61 while the engaging projection 80 slides over the heater 22A. Hence, according to the third embodiment, as illustrated in FIG. 37, the gap D between the two electrodes 61 is greater than the width W of a contact span where the engaging projection 80 contacts the heater 22A. Due to a similar reason, the engaged recess 42 disposed on a rear side of the heater 22A in the connector attachment direction indicated with an arrow in FIG. 37 in which the connector 70B is attached to the heater 22A is preferably disposed in a region that does not overlap each of the electrodes 61 in the width direction X of the heater 22A. For example, the engaged recess 42 is preferably disposed in a region other than shaded regions in FIG. 37.

Figure 38:
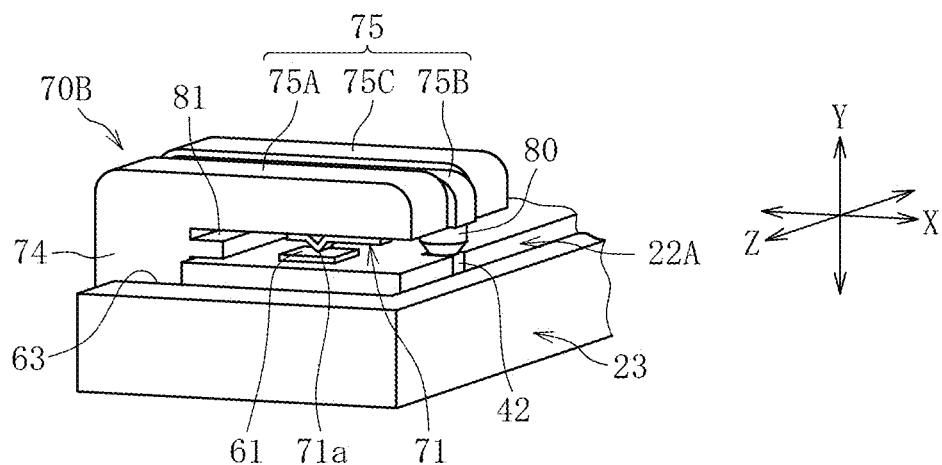
FIG. 38 is a perspective view of the heater depicted in FIG. 36 and the heater holder depicted in FIG. 19 that supports the heater.

FIG. 38 is a perspective view of the heater 22A according to the third embodiment, that is supported by the heater holder 23.

As illustrated in FIG. 38, with the heater 22A and the connector 70B according to the third embodiment also, the heater holder 23 includes the recess 63 that prevents interference with the connector 70B. Accordingly, the connector 70B moves precisely in accordance with displacement of the heater 22A without being restrained by the heater holder 23.

Figure 39:
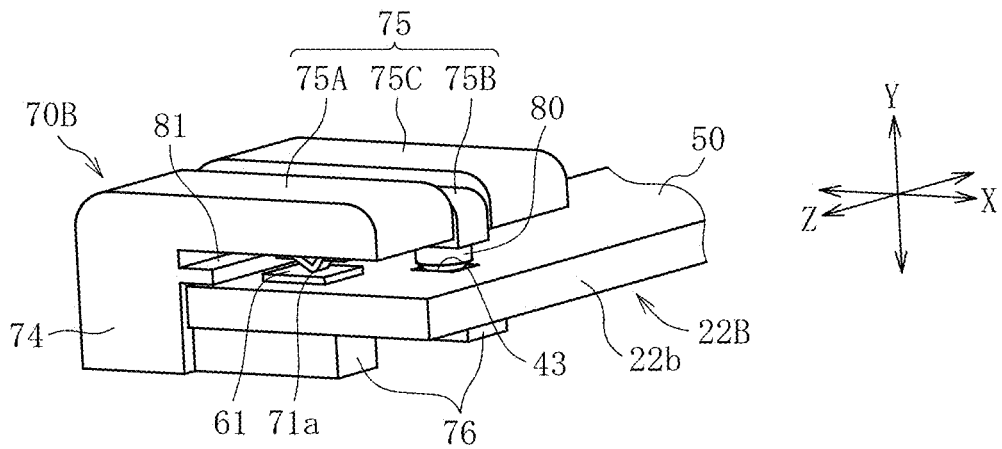
FIG. 39 is a perspective view of a heater as a modification example of the heater according to the third embodiment depicted in FIG. 38.

FIG. 39 is a perspective view of a heater 22B as a modification example of the heater 22A according to the third embodiment of the present disclosure.

Like the modification example illustrated in FIG. 39, instead of the engaged recess 42 depicted in FIG. 24 disposed on the edge face 22b of the heater 22A in the width direction X thereof described above, an engaged portion of the heater 22B, that engages the engaging projection 80, may be an engaged hole 43 disposed in the base 50 and separated from the edge face 22b in the width direction X of the heater 22B. As the engaging projection 80 engages the engaged hole 43, displacement of the connector 70B relative to the heater 22B is restricted bidirectionally in each of the width direction X and the longitudinal direction Z of the heater 22B. The engaged hole 43 may be a through hole that penetrates through the base 50 in the thickness direction Y of the heater 22B or a hole (e.g., a recess) that does not penetrate through the base 50 and has a bottom.

Figure 40:
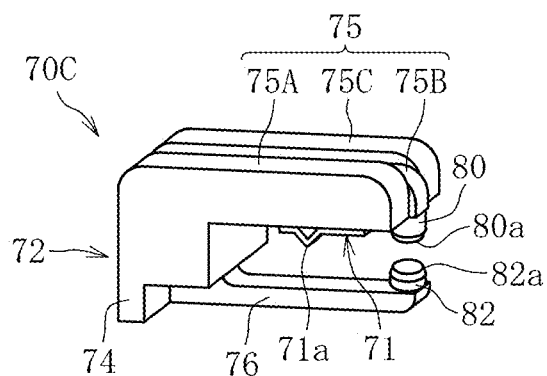
FIG. 40 is a perspective view of a connector according to a fourth embodiment of the present disclosure, that is installable in the fixing device depicted in FIG. 2.

FIG. 40 is a perspective view of a connector 70C according to a fourth embodiment of the present disclosure.

As illustrated in FIG. 40, the connector 70C according to the fourth embodiment includes the engaging projection 80 mounted on the tip of the divided arm 75B disposed at the center of the first arm 75 and an engaging projection 82 mounted on a tip of the second arm 76 disposed opposite the divided arm 75B. Each of the engaging projections 80 and 82 is a circular truncated cone and serves as an engaging portion. Conversely, the connector 70C according to the fourth embodiment does not incorporate the engaging projection 79 that projects from the base 74 and is incorporated in each of the connectors 70, 70A, and 70B according to the first embodiment, the second embodiment, and the third embodiment, respectively, described above.

Figure 41:
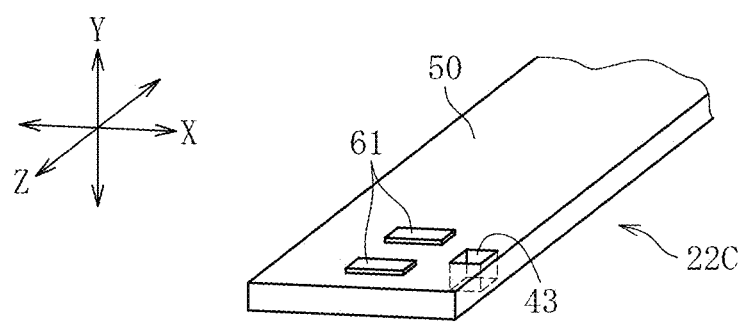
FIG. 41 is a perspective view of a heater according to the fourth embodiment, that is installable in the fixing device depicted in FIG. 2.

FIG. 41 is a perspective view of a heater 22C according to the fourth embodiment of the present disclosure.

As illustrated in FIG. 41, the heater 22C according to the fourth embodiment includes the engaged hole 43 that penetrates through the base 50 in the thickness direction Y thereof and serves as an engaged portion. The heater 22C does not incorporate the engaged recesses 41 and 42 disposed at both ends of the base 50 in the width direction X thereof, respectively.

Figure 42:
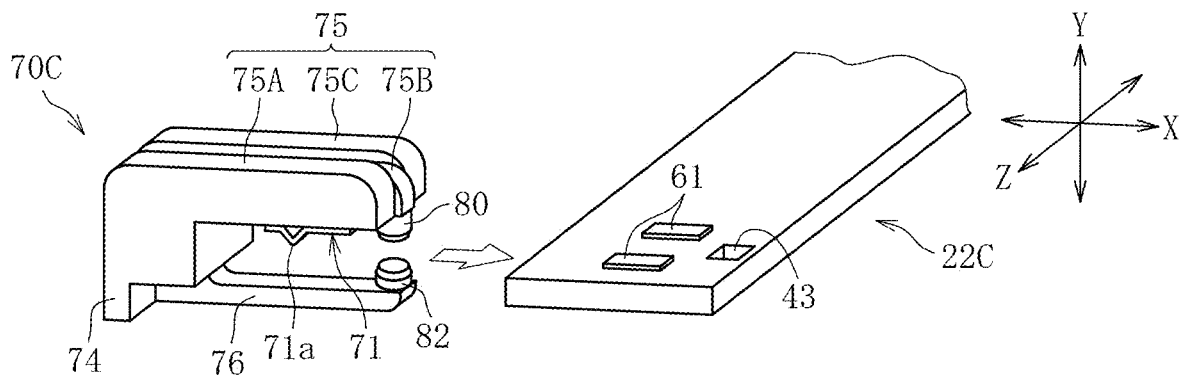
FIG. 42 is a perspective view of the heater depicted in FIG. 41 and the connector depicted in FIG. 40, illustrating a first process of a method for attaching the connector to the heater.

With the connector 70C and the heater 22C according to the fourth embodiment, in order to attach the connector 70C to the heater 22C, as illustrated in FIG. 42, like in the embodiments described above, the connector 70C is moved closer to the heater 22C in the width direction X thereof.

Figure 43:
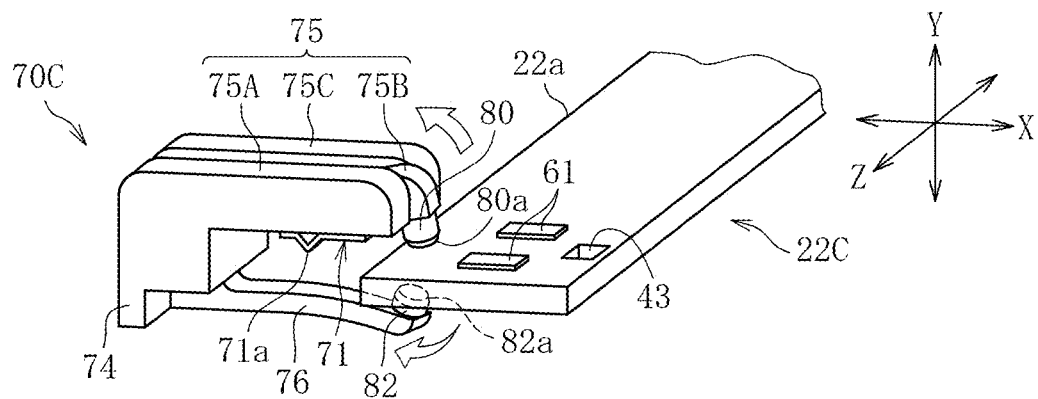
FIG. 43 is a perspective view of the heater and the connector depicted in FIG. 42, illustrating a second process of the method for attaching the connector to the heater.

As illustrated in FIG. 43, as the connector 70C is moved closer to the heater 22C, the pair of engaging projections 80 and 82 of the connector 70C comes into contact with the edge face 22a of the heater 22C in the width direction X thereof (e.g., a front edge face or one edge face of the heater 22C in a connector attachment direction in which the connector 70C is attached to the heater 22C). Accordingly, the edge face 22a lifts one of the engaging projections 80 and 82, that is, the engaging projection 80, and presses down another one of the engaging projections 80 and 82, that is, the engaging projection 82, while the divided arm 75B disposed at the center of the first arm 75 and the second arm 76 are deformed resiliently. Since the engaging projection 80 includes the slope 80a that is tapered and the engaging projection 82 includes a slope 82a that is tapered, the edge face 22a pressingly lifts and lowers the engaging projections 80 and 82 smoothly.

Figure 44:
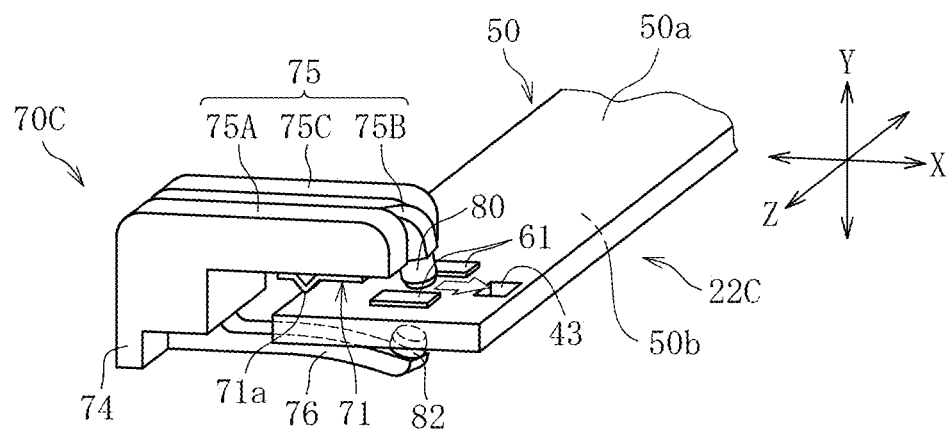
FIG. 44 is a perspective view of the heater and the connector depicted in FIG. 42, illustrating a third process of the method for attaching the connector to the heater.
Figure 45:
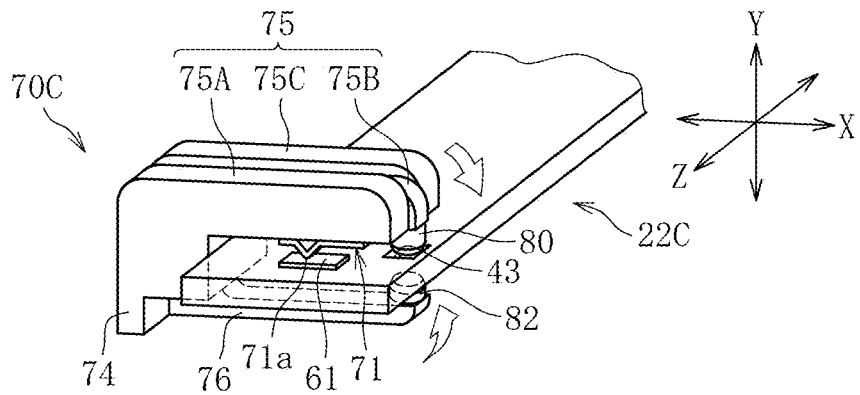
FIG. 45 is a perspective view of the heater and the connector depicted in FIG. 42, illustrating a fourth process of the method for attaching the connector to the heater.
Figure 46:
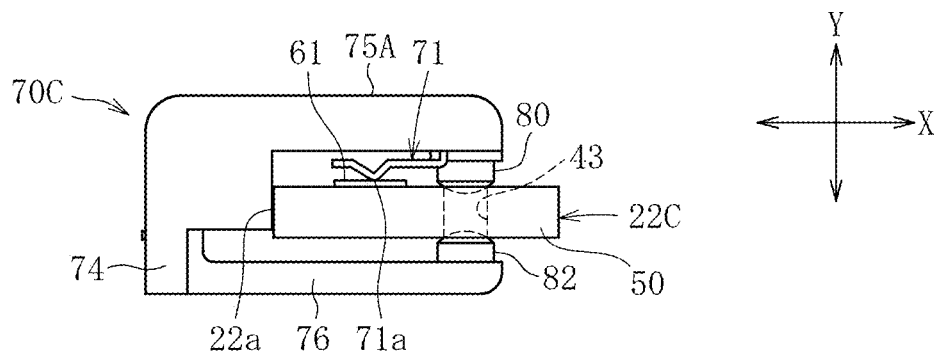
FIG. 46 is a side view of the heater depicted in FIG. 45 and the connector attached to the heater.

As illustrated in FIG. 44, the engaging projections 80 and 82 slide over the electrode mounting face 50a and the opposite face 50b of the base 50 of the heater 22C, respectively. As illustrated in FIG. 45, as each of the engaging projections 80 and 82 reaches the engaged hole 43 of the heater 22C, the divided arm 75B disposed at the center of the first arm 75 and the second arm 76 recover resiliently, engaging each of the engaging projections 80 and 82 with an edge of the engaged hole 43. For example, as illustrated in FIG. 46, since the engaged hole 43 has openings disposed at both ends thereof in the thickness direction V of the heater 22C, respectively, the engaging projections 80 and 82 engage edges of the openings, respectively, of the engaged hole 43. The engaged hole 43 is the through hole that penetrates through the base 50 in the thickness direction Y thereof. Alternatively, the engaged hole 43 may be the hole (e.g., the recess) that has the bottom.

In a state in which the engaging projections 80 and 82 engage the engaged hole 43, the engaging projections 80 and 82 sandwich the heater 22C in the thickness direction Y thereof. Thus, attachment of the connector 70C to the heater 22C finishes, restricting displacement of the connector 70C relative to the heater 22C bidirectionally in each of the width direction X, the longitudinal direction Z, and the thickness direction Y of the heater 22C. Further, according to the fourth embodiment, as illustrated in FIG. 46, the edge face 22a, that is, one edge face, of the heater 22C in the width direction X thereof contacts the base 74 of the connector 70C, attaining a stable posture of the heater 22C.

As described above, with the heater 22C and the connector 70C according to the fourth embodiment, the pair of engaging projections 80 and 82 engages the engaged hole 43 and sandwiches the heater 22C, restricting displacement of the connector 70C relative to the heater 22C bidirectionally in each of the width direction X, the longitudinal direction Z, and the thickness direction Y of the heater 22C. Accordingly, shifting of the connector 70C from the heater 22C is prevented precisely also with the connector 70C and the heater 22C according to the fourth embodiment. Like the connectors 70, 70A, and 70B according to the first embodiment, the second embodiment, and the third embodiment described above, respectively, the connector 70C engages the heater 22C without a separate member that is separable from the connector 70C and the heater 22C and is interposed between the connector 70C and the heater 22C. Accordingly, displacement of the connector 70C relative to the heater 22C is suppressed effectively, decreasing abrasion of the electrodes 61.

Figure 47:
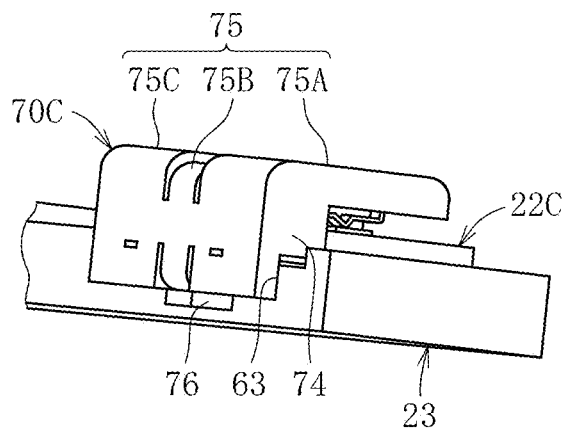
FIG. 47 is a perspective view of the heater depicted in FIG. 46 and the heater holder depicted in FIG. 19 that supports the heater.

FIG. 47 is a perspective view of the heater 22C according to the fourth embodiment, that is supported by the heater holder 23.

As described above, with the heater 22C and the connector 70C according to the fourth embodiment also, the heater holder 23 includes the recess 63 that prevents interference with the connector 70C. Accordingly, the connector 70C moves precisely in accordance with displacement of the heater 22C without being restrained by the heater holder 23.

Figure 48:
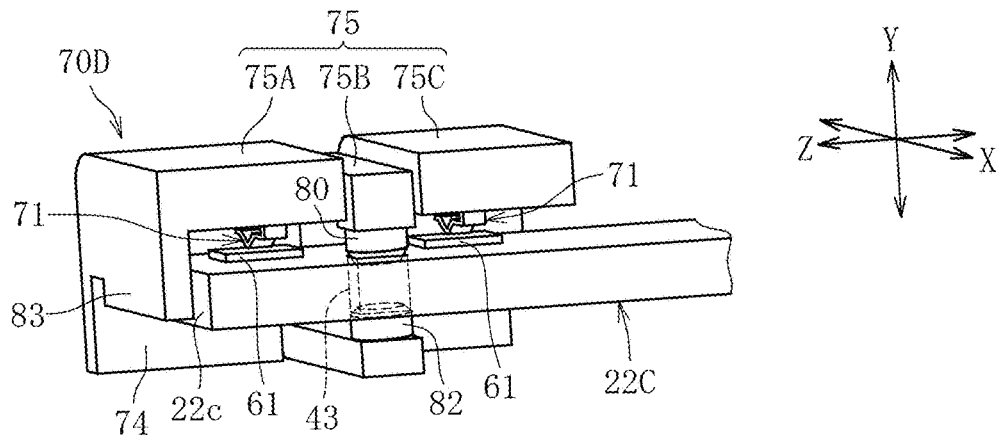
FIG. 48 is a perspective view of a connector according to a fifth embodiment of the present disclosure, that is installable in the fixing device depicted in FIG. 2 and is attached to the heater.

FIG. 48 is a perspective view of a connector 70D according to a fifth embodiment of the present disclosure, that is attached to the heater 22C.

As illustrated in FIG. 48, the connector 70D according to the fifth embodiment includes a guide 83 mounted on one of the divided arms 75A and 75C disposed at both ends of the first arm 75, respectively. FIG. 48 illustrates the guide 83 mounted on the divided arm 75A. Other configuration of the connector 70D is substantially equivalent to the configuration of the connector 70C according to the fourth embodiment described above with reference to FIG. 40.

As described above, with the connector 70D according to the fifth embodiment, since the connector 70D includes the guide 83, when a service engineer attaches the connector 70D to the heater 22C, the service engineer performs an attachment operation while sliding the guide 83 over a lateral edge face 22c, that is, one lateral edge face, of the heater 22C in the longitudinal direction Z of the heater 22C. The attachment operation for attaching the connector 70D to the heater 22C is equivalent to that for attaching the connector 70C according to the fourth embodiment to the heater 22C as described above. Accordingly, the connector 70D engages the heater 22C at a predetermined position readily, improving accuracy of the attachment operation and facilitating the attachment operation.

Figure 49:
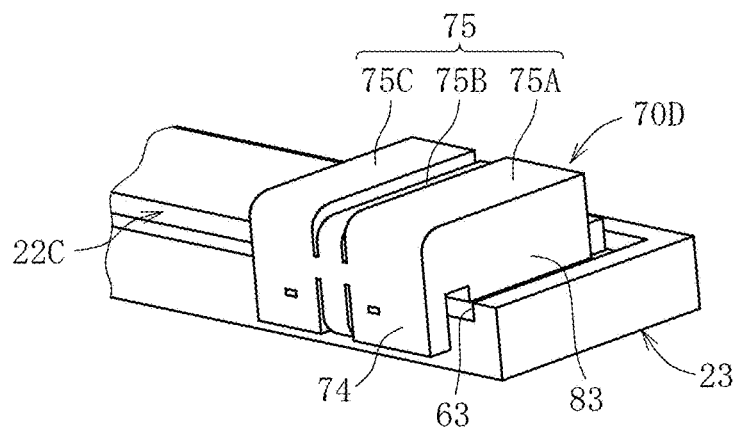
FIG. 49 is a perspective view of the heater depicted in FIG. 48 and the heater holder depicted in FIG. 19 that supports the heater.

As illustrated in FIG. 49, like in the embodiments described above, with the connector 70D according to the fifth embodiment also, the heater holder 23 includes the recess 63 that prevents interference with the connector 70D. Accordingly, the connector 70D moves precisely in accordance with displacement of the heater 22C without being restrained by the heater holder 23.

Figure 50:
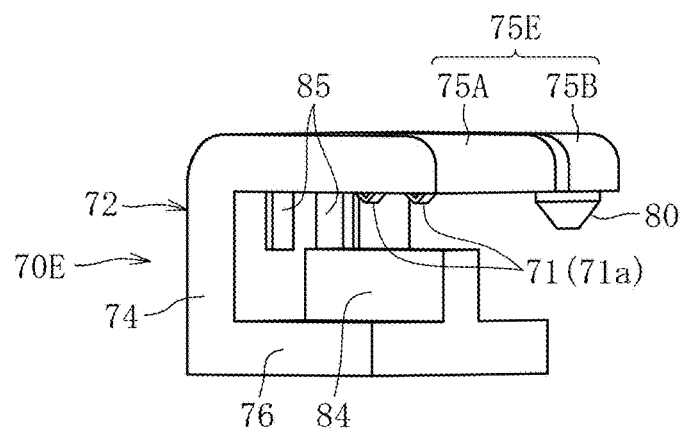
FIG. 50 is a perspective view of a connector according to a sixth embodiment of the present disclosure, that is installable in the fixing device depicted in FIG. 2.

FIG. 50 is a perspective view of a connector 70E according to a sixth embodiment of the present disclosure.

As illustrated in FIG. 50, the connector 70E according to the sixth embodiment includes a first arm 75E that is divided into two divided arms, that is, the divided arms 75A and 75B. The divided arm 75B having a decreased width in the longitudinal direction Z of a heater 22E depicted in FIG. 51 mounts the engaging projection 80 that serves as an engaging portion and is shaped in a circular truncated cone. Conversely, the divided arm 75A having an increased width in the longitudinal direction Z of the heater 22E depicted in FIG. 51 mounts the two connector terminals 71. The second arm 76, disposed opposite the first arm 75E, mounts a support 84 that projects from the second arm 76 and supports the heater 22E. Additionally, according to the sixth embodiment, the base 74 mounts a plurality of abutment portions 85 that projects from the base 74 and abuts on the heater 22E.

Figure 51:
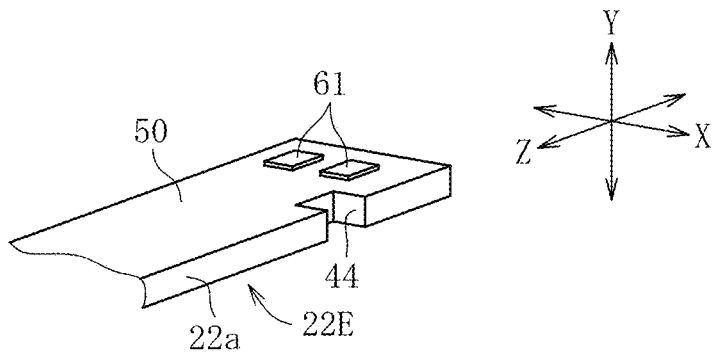
FIG. 51 is a perspective view of a heater according to the sixth embodiment, that is installable in the fixing device depicted in FIG. 2.

FIG. 51 is a perspective view of the heater 22E according to the sixth embodiment of the present disclosure.

As illustrated in FIG. 51, the heater 22E according to the sixth embodiment includes an engaged recess 44 that serves as an engaged portion and is disposed in the edge face 22a, that is, one edge face of the heater 22E in the width direction X thereof.

Figure 52:
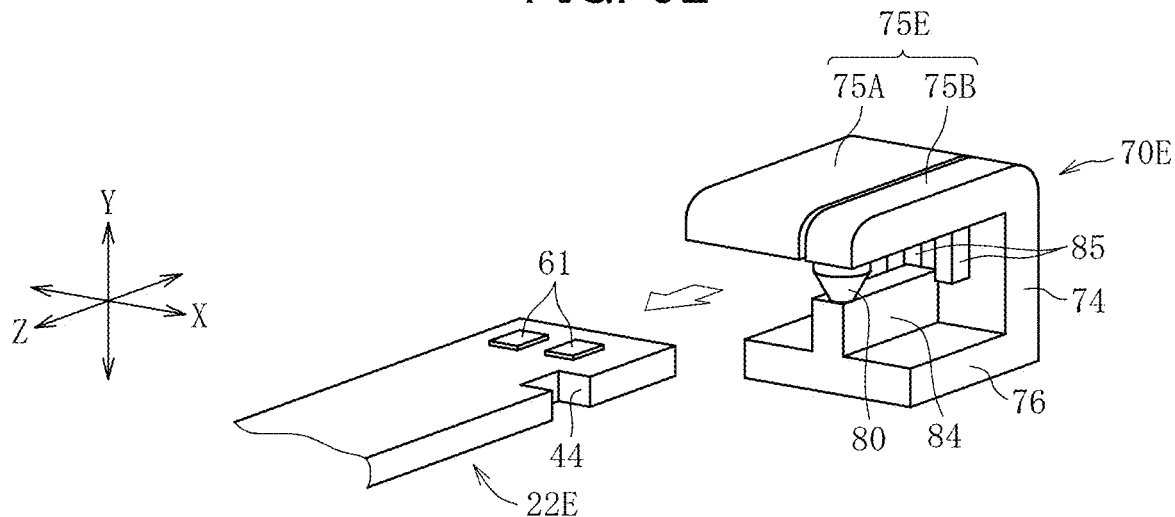
FIG. 52 is a perspective view of the heater depicted in FIG. 51 and the connector depicted in FIG. 50, illustrating a first process of a method for attaching the connector to the heater.

The connector 70E according to the sixth embodiment, that is configured as described above, is attached to the heater 22E in a connector attachment direction different from the connector attachment direction in which the connectors 70, 70A, 70B, 70C, and 70D according to the first to fifth embodiments, respectively, are attached to the heaters 22, 22A, 22B, and 22C. For example, according to the sixth embodiment illustrated in FIG. 52, the connector 70E is moved closer to the heater 22E in the longitudinal direction Z thereof.

Figure 53:
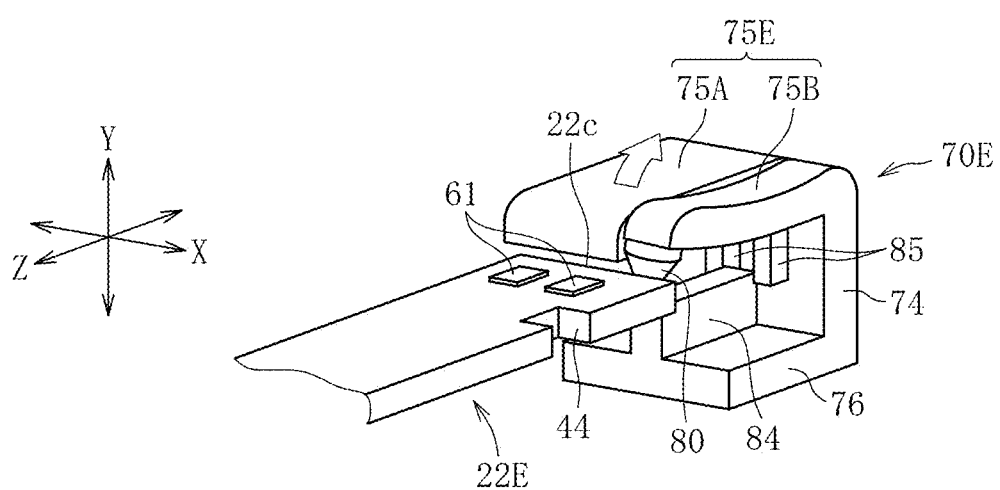
FIG. 53 is a perspective view of the heater and the connector depicted in FIG. 52, illustrating a second process of the method for attaching the connector to the heater.
Figure 54:
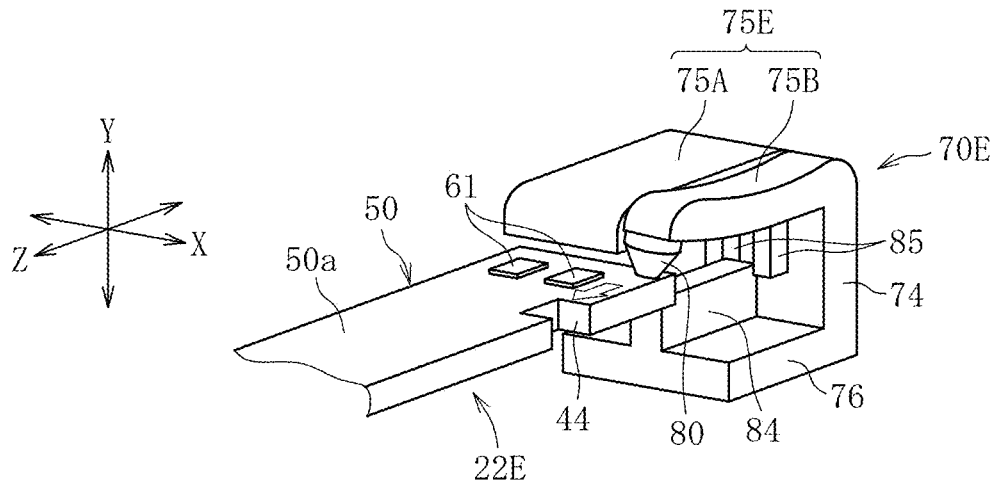
FIG. 54 is a perspective view of the heater and the connector depicted in FIG. 52, illustrating a third process of the method for attaching the connector to the heater.
Figure 55:
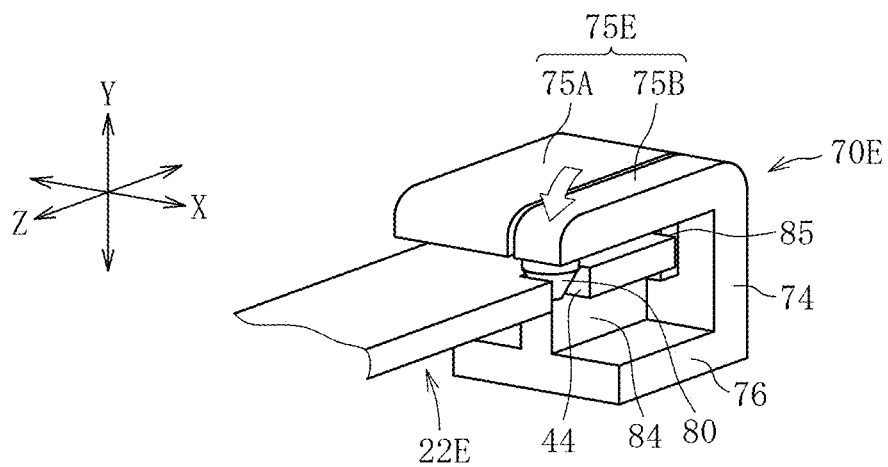
FIG. 55 is a perspective view of the heater and the connector depicted in FIG. 52, illustrating a fourth process of the method for attaching the connector to the heater.

As illustrated in FIG. 53, as the connector 70E is moved closer to the heater 22E and the engaging projection 80 comes into contact with the lateral edge face 22c, that is, one lateral edge face, of the heater 22E in the longitudinal direction Z thereof, the lateral edge face 22c lifts the engaging projection 80 while the divided arm 75B is deformed resiliently. As illustrated in FIG. 54, the engaging projection 80 slides over the electrode mounting face 50a of the base 50 of the heater 22E, that mounts the electrodes 61. As illustrated in FIG. 55, as the engaging projection 80 reaches the engaged recess 44 of the heater 22E, the divided arm 75B recovers resiliently and presses down the engaging projection 80 in FIG. 55. The engaging projection 80 engages an edge of the engaged recess 44. Thus, attachment of the connector 70E to the heater 22E finishes. The engaging projection 80 engages the engaged recess 44, restricting displacement of the connector 70E relative to the heater 22E unidirectionally in the width direction X and bidirectionally in the longitudinal direction Z of the heater 22E.

Figure 56:
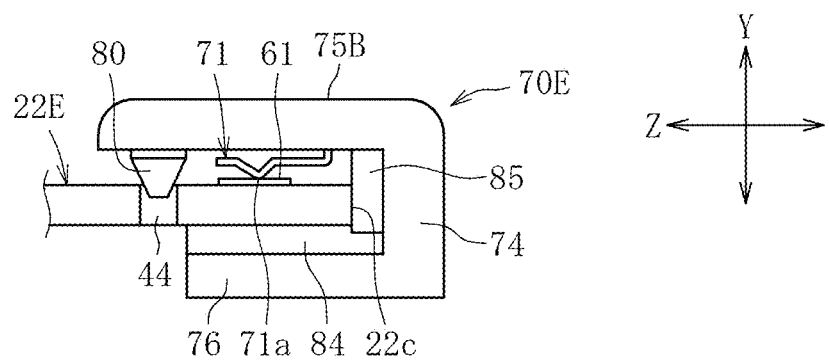
FIG. 56 is a side view of the heater depicted in FIG. 55 and the connector attached to the heater.

As illustrated in FIG. 56, in a state in which attachment of the connector 70E to the heater 22E is finished, the connector terminals 71 and the support 84 sandwich the heater 22E in the thickness direction Y thereof, restricting displacement of the connector 70E relative to the heater 22E bidirectionally in the thickness direction Y thereof. Further, the abutment portions 85 of the connector 70E come into contact with the lateral edge face 22c, that is, one lateral edge face, of the heater 22E in the longitudinal direction Z thereof in this state, positioning the connector 70E with respect to the heater 22E unidirectionally in the longitudinal direction Z thereof. Additionally, as the support 84 and the abutment portions 85 contact the heater 22E, a frictional resistance generates at contact positions where the support 84 and the abutment portions 85 contact the heater 22E, restricting displacement of the connector 70E relative to the heater 22E bidirectionally in each of the longitudinal direction Z and the width direction X of the heater 22E.

As described above, with the heater 22E and the connector 70E according to the sixth embodiment also, displacement of the connector 70E relative to the heater 22E is restricted bidirectionally in each of the longitudinal direction Z, the width direction X, and the thickness direction Y of the heater 22E. Accordingly, shifting of the connector 70E from the heater 22E is suppressed precisely. Like the connectors 70, 70A, 70B, 70C, and 70D according to the first to fifth embodiments described above, respectively, the connector 70E engages the heater 22E without a separate member that is separable from the connector 70E and the heater 22E and is interposed between the connector 70E and the heater 22E. Accordingly, displacement of the connector 70E relative to the heater 22E, is suppressed effectively, decreasing abrasion of the electrodes 61 effectively.

Figure 57:
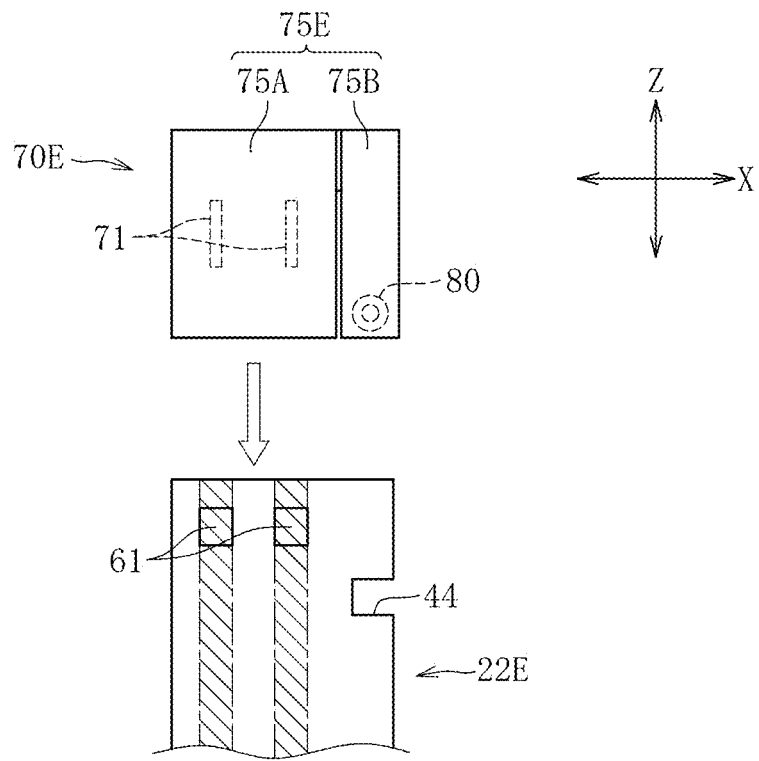
FIG. 57 is a plan view of the heater and the connector depicted in FIG. 52.

As illustrated in FIG. 57, when the connector 70E is moved closer to the healer 22E in the longitudinal direction Z thereof to attach the connector 70E to the heater 22E, in order to prevent the engaging projection 80 from coming into contact with the electrodes 61, the engaged recess 44 is preferably disposed in a region that does not overlap each of the electrodes 61 in the longitudinal direction Z of the heater 22E. For example, the engaged recess 44 is preferably disposed in a region other than shaded regions in FIG. 57.

Figure 58:
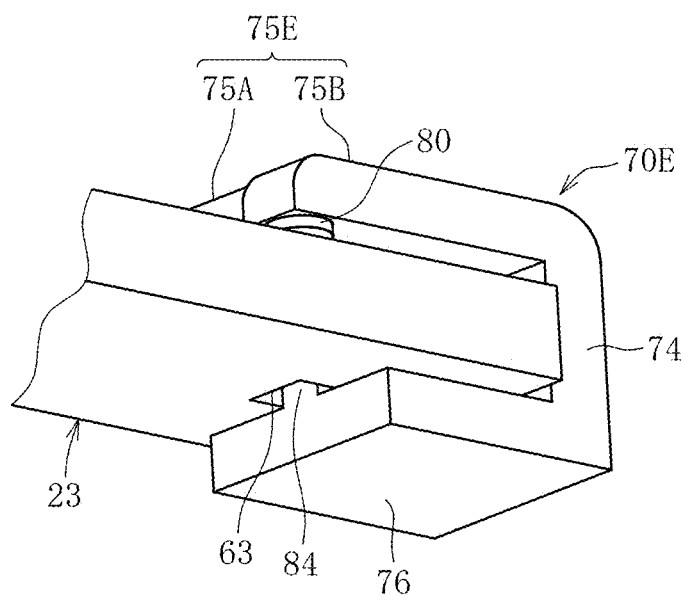
FIG. 58 is a perspective view of the heater depicted in FIG. 56 and the heater holder depicted in FIG. 19 that supports the heater.

FIG. 58 is a perspective view of the heater 22E according to the sixth embodiment, that is supported by the heater holder 23.

As illustrated in FIG. 58, with the connector 70E and the heater 22E according to the sixth embodiment also, the heater holder 23 includes the recess 63 that prevents interference with the connector 70E. Accordingly, the connector 70E moves precisely in accordance with displacement of the heater 22E without being restrained by the heater holder 23.

Figure 59:
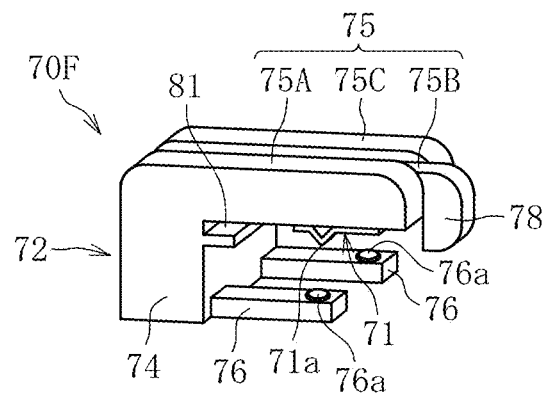
FIG. 59 is a perspective view of a connector according to a seventh embodiment of the present disclosure, that is installable in the fixing device depicted in FIG. 2.

FIG. 59 is a perspective view of a connector 70F according to a seventh embodiment of the present disclosure.

As illustrated in FIG. 59, the connector 70F according to the seventh embodiment includes the engaging pawl 78 that has a claw shape instead of the engaging projection 80, having the circular truncated cone shape, of the connector 70B depicted in FIG. 30. The connector 70F omits the engaging projection 79 projecting from the base 74 depicted in FIG. 30. Other configurations of the connector 70F according to the seventh embodiment are basically equivalent to those of the connector 70B according to the third embodiment depicted in FIG. 30.

Figure 60:
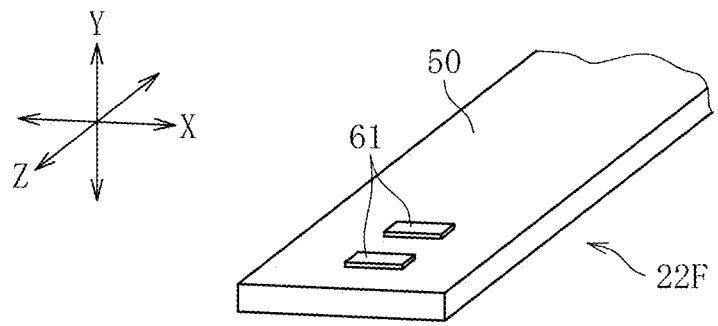
FIG. 60 is a perspective view of a heater according to the seventh embodiment, that is installable in the fixing device depicted in FIG. 2.

FIG. 60 is a perspective view of a heater 22F according to the seventh embodiment of the present disclosure.

As illustrated in FIG. 60, the heater 22F according to the seventh embodiment does not incorporate the engaged recesses 41, 42, and 44 and the engaged hole 43 described above. For example, the heater 22F according to the seventh embodiment includes the base 50 that is platy and is not provided with a recess, a projection, and a hole.

Figure 61:
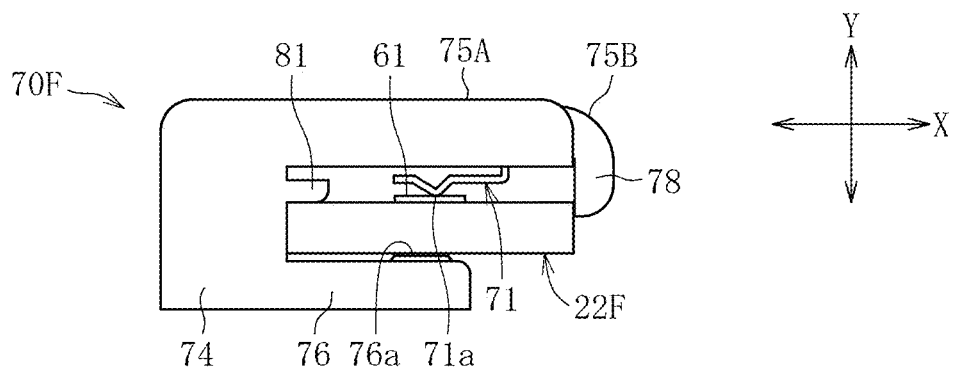
FIG. 61 is a side view of the heater depicted in FIG. 60 and the connector depicted in FIG. 59 that is attached to the heater.

In order to attach the connector 70F to the heater 22F according to the seventh embodiment, like the connector 70B attached to the heater 22A according to the third embodiment described above, the connector 70F is moved closer to the heater 22F in the width direction X thereof to attach the connector 70F to the heater 22F. However, according to the seventh embodiment, as illustrated in FIG. 61, in a state in which attachment of the connector 70F to the heater 22F is finished, the engaging pawl 78 and the base 74 of the connector 70F sandwich the heater 22F in the width direction X thereof, restricting displacement of the connector 70F relative to the heater 22F bidirectionally in the width direction X thereof. Additionally, in this state, a frictional resistance between the engaging pawl 78 and the heater 22F and a frictional resistance between the base 74 and the heater 22F restrict displacement of the connector 70F relative to the heater 22F bidirectionally in the longitudinal direction Z thereof also.

As described above, with the heater 22F according to the seventh embodiment, that does not incorporate the engaged recesses 41, 42, and 44 and the engaged hole 43 also, displacement of the connector 70F relative to the heater 22F is restricted bidirectionally in each of the longitudinal direction Z, the width direction X, and the thickness direction Y of the heater 22F. Additionally, in this case, since the heater 22F is not produced with the engaged recesses 41, 42, and 44 and the engaged hole 43, the heater 22F is machined readily. Hence, if ceramic that is intractable compared to metal is used as a material of the heater 22F, the heater 22F according to the seventh embodiment preferably employs the configuration described above.

Figure 62:
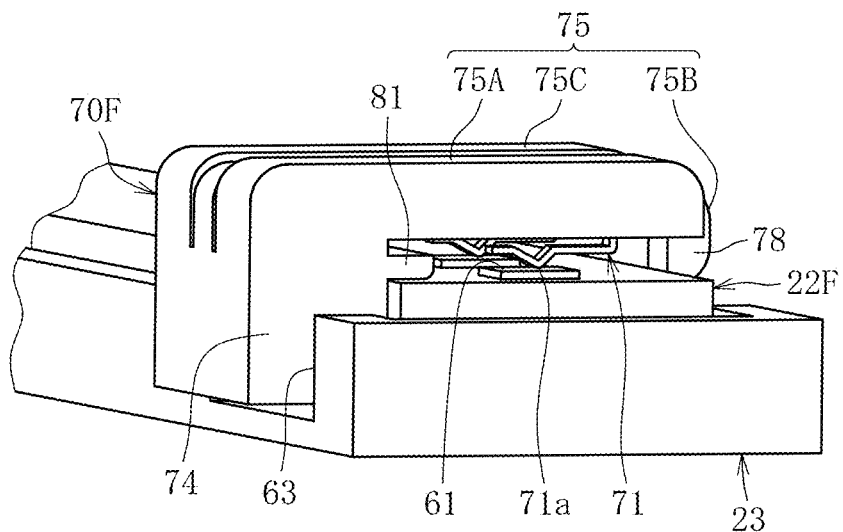
FIG. 62 is a perspective view of the heater depicted in FIG. 61 and the heater holder depicted in FIG. 19 that supports the heater.

FIG. 62 is a perspective view of the heater 22F according to the seventh embodiment, that is supported by the heater holder 23.

As illustrated in FIG. 62, with the connector 70F and the heater 22F according to the seventh embodiment also, the heater holder 23 includes the recess 63 that prevents interference with the connector 70F. Accordingly, the connector 70F moves precisely in accordance with displacement of the heater 22F without being restrained by the heater holder 23.

The above describes the embodiments of the present disclosure. According to the embodiments described above, displacement of a connector (e.g., the connectors 70, 70A, 70B, 70C, 70D, 70E, and 70F) relative to a heater (e.g., the heaters 22, 22A, 22B, 22C, 22E, and 22F) is restricted bidirectionally in each of the longitudinal direction Z, the width direction X, and the thickness direction Y of the heater without a separate member that is separable from the connector and the heater and is interposed between the connector and the heater. Accordingly, shifting of the connector from the heater is suppressed effectively, retaining conductivity between the connector terminals 71 and the electrodes 61 properly for an extended period of time. Restriction of relative displacement described in the present disclosure (e.g., displacement of the connector relative to the heater) denotes, in addition to restriction of displacement by engagement between the engaging portion and the engaged portion described above and restriction of displacement by contact between opposed faces or opposed portions that are disposed opposite each other, restriction of displacement by a frictional resistance generated at contact faces or contact portions that contact each other. The engaging portion, the engaged portion, and the like that contribute to restrict the relative displacement are not limited to those having a configuration in which the engaging portion, the engaged portion, and the like are combined into the connector or the heater and may be separated from the connector or the heater as long as the engaging portion, the engaged portion, and the like are secured to the connector or the heater.

According to the embodiments described above, in a state in which the connector is attached to the heater, the heater and the connector do not interfere with other member. Accordingly, the connector moves precisely in accordance with displacement of the heater without receiving interference from other member, retaining conductivity between the connector terminals 71 and the electrodes 61 properly for an extended period of time.

Figure 63:
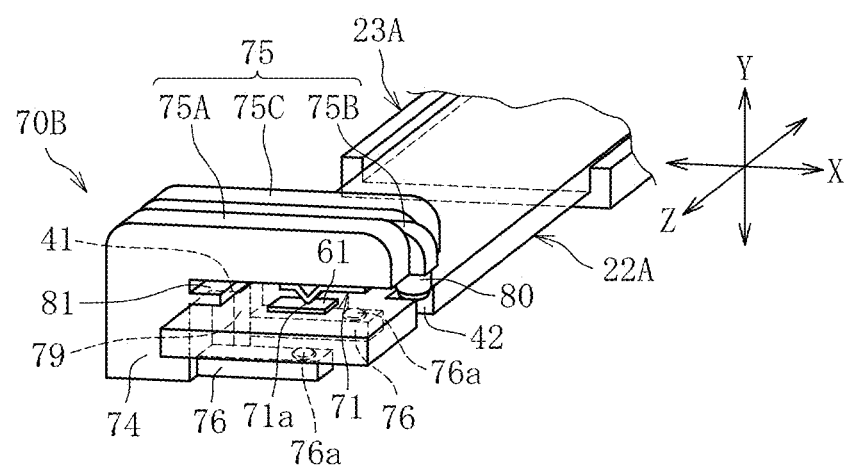
FIG. 63 is a perspective view of a heater holder as a modification example of the heater holder depicted in FIG. 62.

According to the embodiments described above, the heater holder 23 supports the heater throughout a substantially entire span of the heater, that is other than an attachment span where the connector is attached to the heater, in the longitudinal direction Z of the heater. Accordingly, even if the heater is exerted with a load, the heater holder 23 suppresses deformation of the heater effectively. If the heater is barely subject to deformation, as illustrated in FIG. 63, a heater holder 23A is shorter than the heater 22A in the longitudinal direction Z thereof. The heater holder 23A does not support one lateral end span of the heater 22A, that is attached with the connector 70B, in the longitudinal direction Z of the heater 22A. The heater holder 23A does not incorporate the recess 63 and the like that prevent interference with the connector 70B, suppressing degradation in strength of the heater holder 23A and improving durability of the heater holder 23A.

According to the embodiments described above, the connector is attached to each lateral end span of the heater in the longitudinal direction Z thereof. Alternatively, the connector may be attached to one lateral end span of the heater in the longitudinal direction Z thereof.

Figure 64A:
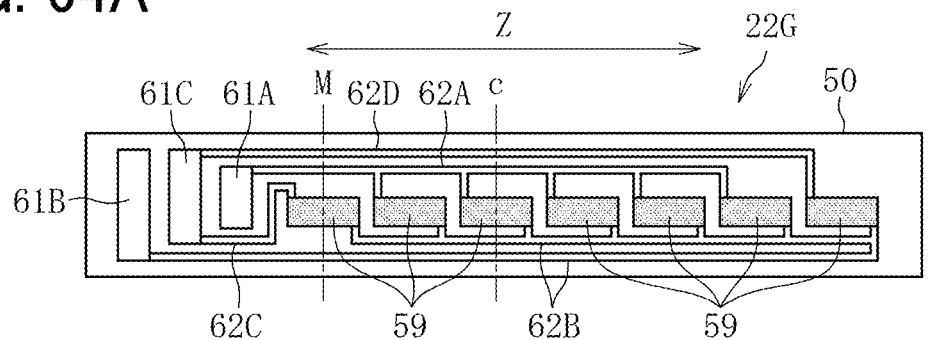
FIG. 64A is a plan view of a heater as a first modification example of the heater depicted in FIG. 7.
Figure 64B:
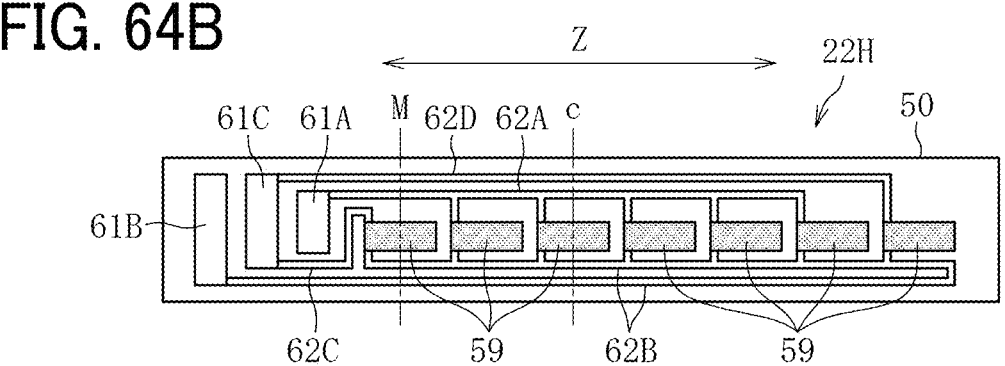
FIG. 64B is a plan view of a heater as a second modification example of the heater depicted in FIG. 7.
Figure 64C:
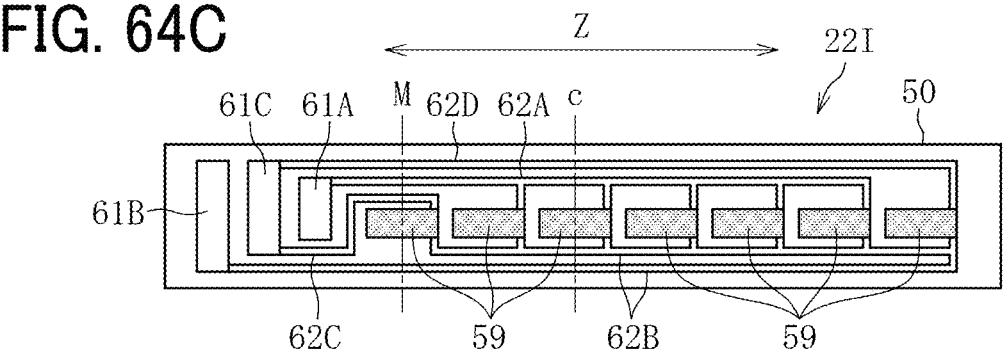
FIG. 64C is a plan view of a heater as a third modification example of the heater depicted in FIG. 7.
Figure 64D:
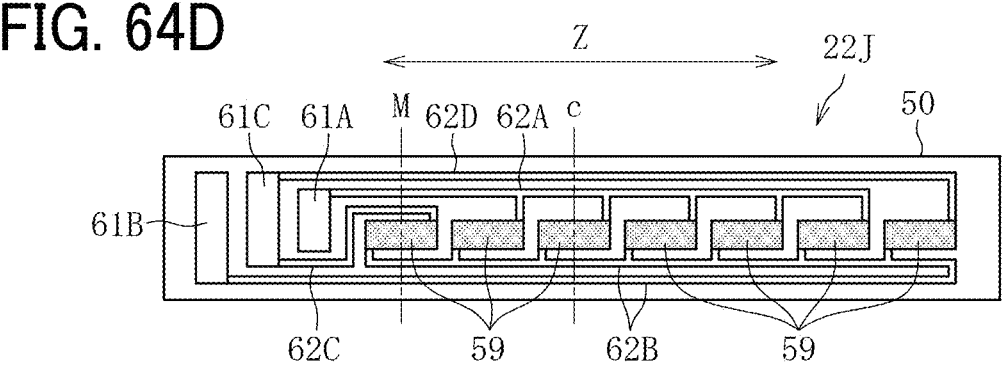
FIG. 64D is a plan view of a heater as a fourth modification example of the heater depicted in FIG. 7.

As examples of the heater attached with the connector in one lateral end span of the heater in the longitudinal direction Z thereof. FIGS. 64A, 64B, 64C, and 64C illustrate heaters 22G, 22H, 22I, and 22J, respectively. Each of the heaters 22G, 22H, 22I, and 22J includes the electrodes 61A, 61B, and 61C that are disposed in a lateral end span (e.g., a left side in FIGS. 64A, 64B, 64C, and 64D) that is outboard from the center c of the base 50 in the longitudinal direction Z thereof. The connector (e.g., the connectors 70, 70A, 70B, 70C, 70D, 70E, and 70F) is attached to one lateral end span of each of the heaters 22G, 22H, 22I, and 22J in the longitudinal direction Z thereof. As illustrated in FIGS. 64A, 64B, 64C, and 64D, the heaters 22G, 22H, 22I, and 22J have a similar construction except difference in connecting positions of the feeders 62A, 62B, 62C, and 62D with respect to resistive heat generators 59. For example, in examples illustrated in FIGS. 64A, 64B, 64C, and 64D, among the connecting positions of the feeders 62A, 62B, 62C, and 62D with respect to the resistive heat generators 59, the connecting position of the feeder 62B with respect to the resistive heat generator 59 (e.g., a lower connecting position disposed below the resistive heat generator 59 in FIGS. 64A, 64B, 64C, and 64D) and the connecting position of each of the feeders 62A, 62C, and 62D other than the feeder 62B with respect to the resistive heat generator 59 (e.g., an upper connecting position disposed above the resistive heat generator 59 in FIGS. 64A, 64B, 64C, and 64D) are different in that the connecting positions are disposed in opposite sides with respect to a center M of the resistive heat generator 59 in the longitudinal direction Z of the heaters 22G, 22H, 22I, and 22J as illustrated in FIGS. 64A and 64D or in that the connecting positions are disposed in an identical side as illustrated in FIGS. 64B and 64C.

Figure 65:
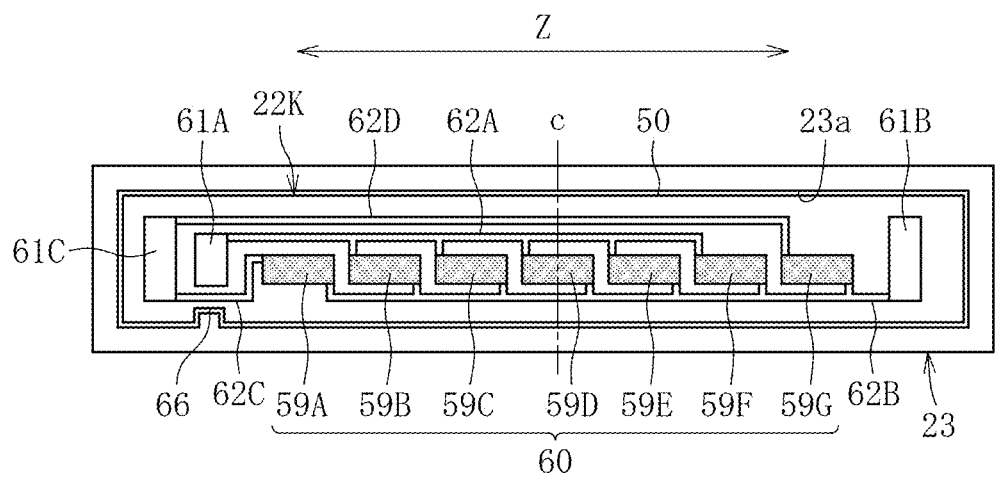
FIG. 65 is a plan view of a heater installable in the fixing device depicted in FIG. 2, that incorporates a positioner as a first example.

The embodiments of the present disclosure are also applicable to a heater 22K illustrated in FIG. 65. The heater 22K includes a positioner 66 disposed in one lateral end span of the base 50, that is disposed outboard from the center c of the base 50 in the longitudinal direction Z thereof. The positioner 66 positions the heater 22K with respect to the heater holder 23 in the longitudinal direction Z of the heater 22K. The heater 22K is displaced with respect to the heater holder 23 substantially in the longitudinal direction Z of the heater 22K in an end of another lateral end span disposed opposite the one lateral end span where the positioner 66 is situated via the center c. Accordingly, the electrode 61B disposed in the another lateral end span where the heater 22K is displaced relative to the heater holder 23 substantially, that is, the another lateral end span opposite the one lateral end span where the positioner 66 is disposed, and a connector coupled to the electrode 61B are preferably applied with any one of the embodiments of the present disclosure. Accordingly, shifting of the connector from the electrode 61B disposed in the another lateral end span where the heater 22K is subject to displacement relative to the heater holder 23 is suppressed effectively.

Figure 66:
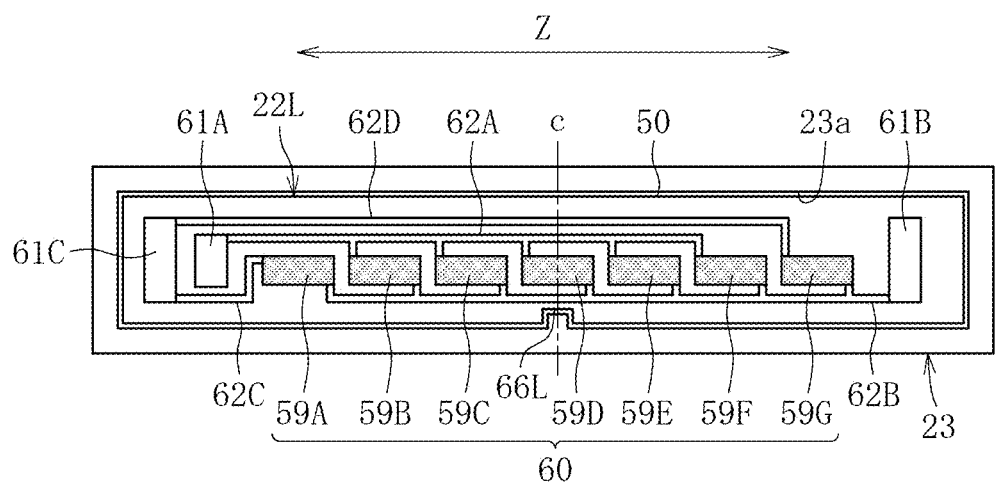
FIG. 66 is a plan view of a heater installable in the fixing device depicted in FIG. 2, that incorporates a positioner as a second example.

FIG. 66 illustrates a heater 22L that includes a positioner 66L that positions the heater 22L with respect to the heater holder 23. The positioner 66L is disposed at the center c of the base 50 in the longitudinal direction Z thereof. Accordingly, even if the heater 22L thermally expands, the center c of the base 50 in the longitudinal direction Z thereof does not shift or does barely shift from a center of a sheet P in a width direction thereof advantageously. Conversely, if the heater 22L thermally expands, the heater 22L is displaced with respect to the heater holder 23 in both lateral end spans of the heater 22L in the longitudinal direction Z thereof. To address this circumstance, the heater 22L illustrated in FIG. 66 preferably employs a coupling mechanism configured according to any one of the embodiments described above. The coupling mechanism couples connectors to the electrodes 61A and 61C disposed in one lateral end span and the electrode 61B disposed in another lateral end span of the heater 22L in the longitudinal direction Z thereof. Accordingly, the connectors and the heater 22L suppress shifting of the connectors from the heater 22L effectively and suppress faulty connection between connector terminals of the connectors and the electrodes 61A, 61C, and 61B, damage to the heater holder 23, and the like, that are caused by thermal expansion of the heater 22L.

As illustrated in FIG. 1, the image forming apparatus 100 incorporates the fixing device 9. Alternatively, the image forming apparatus 100 may incorporate fixing devices 9S, 9T, and 9U illustrated in FIGS. 67, 68, and 69, respectively. The following briefly describes a construction of each of the fixing devices 9S, 9T, and 9U illustrated in FIGS. 67, 68, and 69, respectively.

Figure 67:
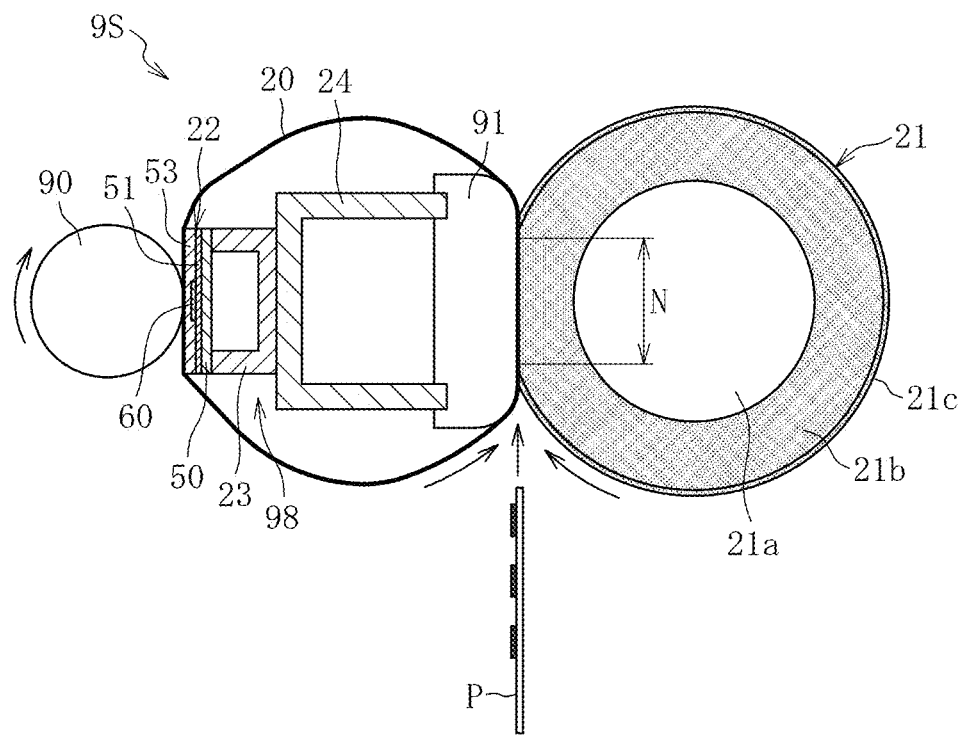
FIG. 67 is a schematic cross-sectional view of a fixing device installable in the image forming apparatus depicted in FIG. 1 as a first variation of the fixing device depicted in FIG. 2.

The fixing device 9S depicted in FIG. 67 is different from the fixing device 9 depicted in FIG. 2 in that the fixing device 9S includes a pressing roller 90 disposed opposite the pressure roller 21 via the fixing belt 20. The pressing roller 90 and the heater 22 sandwich the fixing belt 20 so that the heater 22 heats the fixing belt 20. On the other hand, a nip former 91 (e.g., a nip forming pad) is in contact with the inner circumferential surface of the fixing belt 20 and disposed opposite the pressure roller 21 via the fixing belt 20. The stay 24 supports the nip former 91. The nip former 91 and the pressure roller 21 sandwich the fixing belt 20 and define the fixing nip N.

Figure 68:
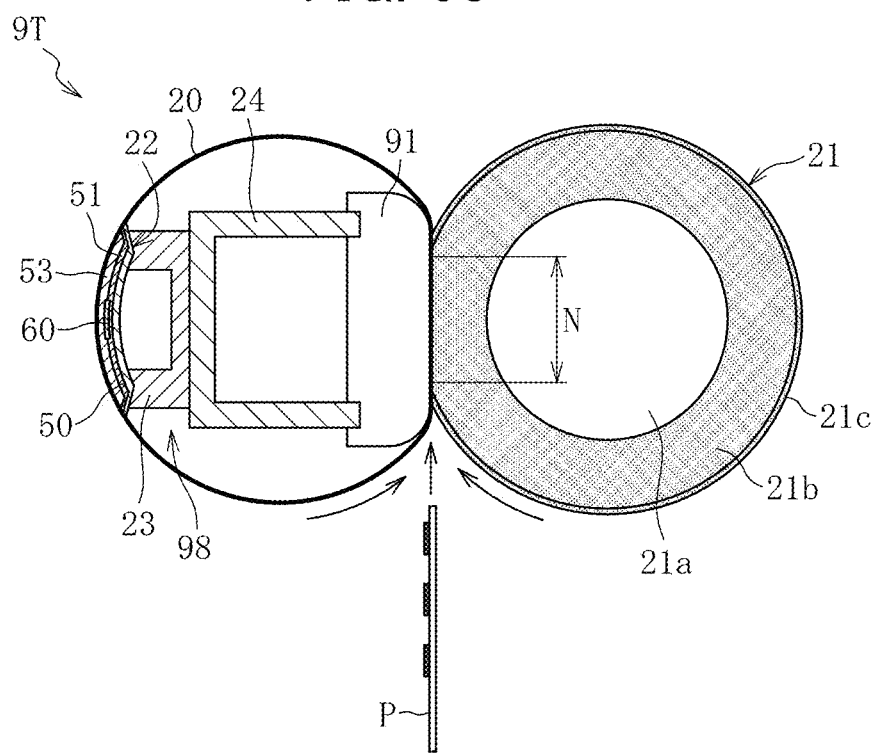
FIG. 68 is a schematic cross-sectional view of a fixing device installable in the image forming apparatus depicted in FIG. 1 as a second variation of the fixing device depicted in FIG. 2.

FIG. 68 illustrates the fixing device 9T that does not incorporate the pressing roller 90 described above with reference to FIG. 67. In order to attain a contact length for which the heater 22 contacts the fixing belt 20 in the circumferential direction thereof, the heater 22 is curved into an arc in cross section that corresponds to a curvature of the fixing belt 20, Other construction of the fixing device 9T is equivalent to that of the fixing device 9S depicted in FIG. 67.

Figure 69:
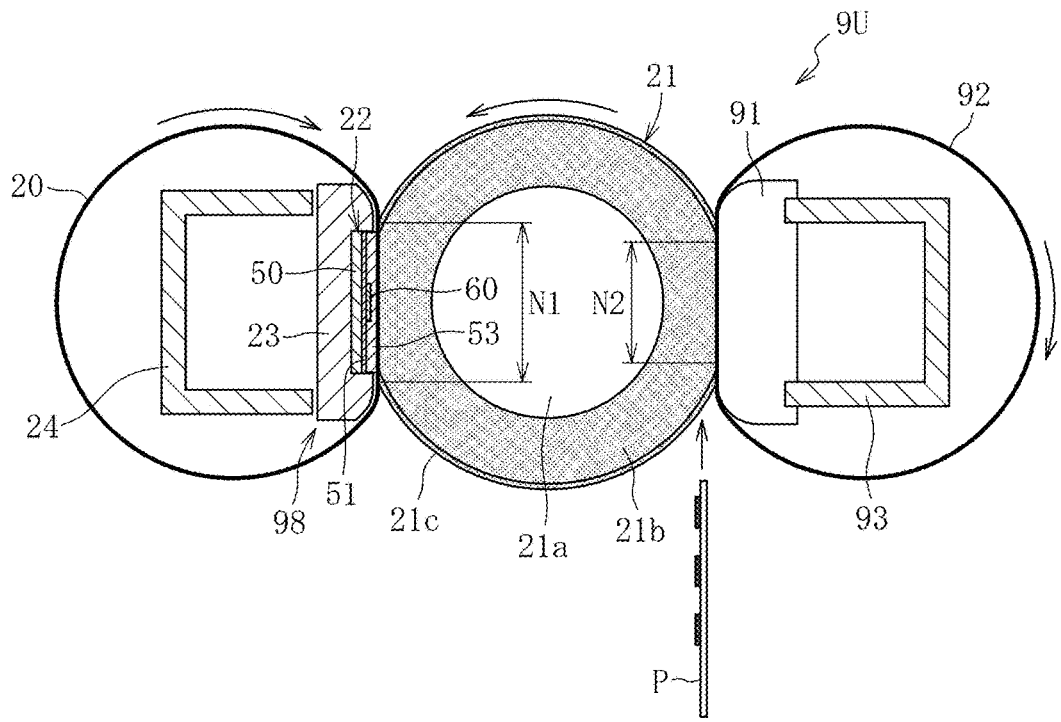
FIG. 69 is a schematic cross-sectional view of a fixing device installable in the image forming apparatus depicted in FIG. 1 as a third variation of the fixing device depicted in FIG. 2.

FIG. 69 illustrates the fixing device 9U that includes a pressure belt 92 in addition to the fixing belt 20. The pressure belt 92 and the pressure roller 21 form a fixing nip N2 serving as a secondary nip separately from a heating nip N1 serving as a primary nip formed between the fixing belt 20 and the pressure roller 21. For example, the nip former 91 and a stay 93 are disposed opposite the fixing belt 20 via the pressure roller 21. The pressure belt 92 accommodates the nip former 91 and the stay 93. Other construction of the fixing device 9U is equivalent to that of the fixing device 9 depicted in FIG. 2.

The image forming apparatus 100 incorporating one of the fixing devices 9S, 9T, and 9U illustrated in FIGS. 67, 68, and 69, respectively, employs any one of the embodiments of the present disclosure, thus suppressing shifting of a connector (e.g., the connectors 70, 70A, 70B, 70C, 70D, 70E, and 70F) from a heater (e.g., the heaters 22, 22A, 22B, 22C, 22E, 22F, 22G, 22H, 22I, 22J, 22K, and 22L) effectively and retaining conductivity between the connector terminals 71 and the electrodes 61 properly for an extended period of time.

The above describes the embodiments applied to a fixing device (e.g., the fixing devices 9, 9S, 9T, and 9U) including the heating device 98 as one example. However, the embodiments of the present disclosure are also applicable to devices other than the fixing device. For example, the embodiments of the present disclosure are also applicable to a heating device such as a dryer installed in an image forming apparatus employing an inkjet method. The dryer heats a sheet bearing ink or liquid and dries the ink or the liquid on the sheet.

Alternatively, in addition to the image forming apparatus 100, the embodiments of the present disclosure may be applied to a heating device incorporated in a thermocompression bonding apparatus such as a laminator that thermally presses a coating member such as film on a surface of a sheet (e.g., paper) and a heat sealer that thermally presses a sealing portion of a package.

Figure 70:
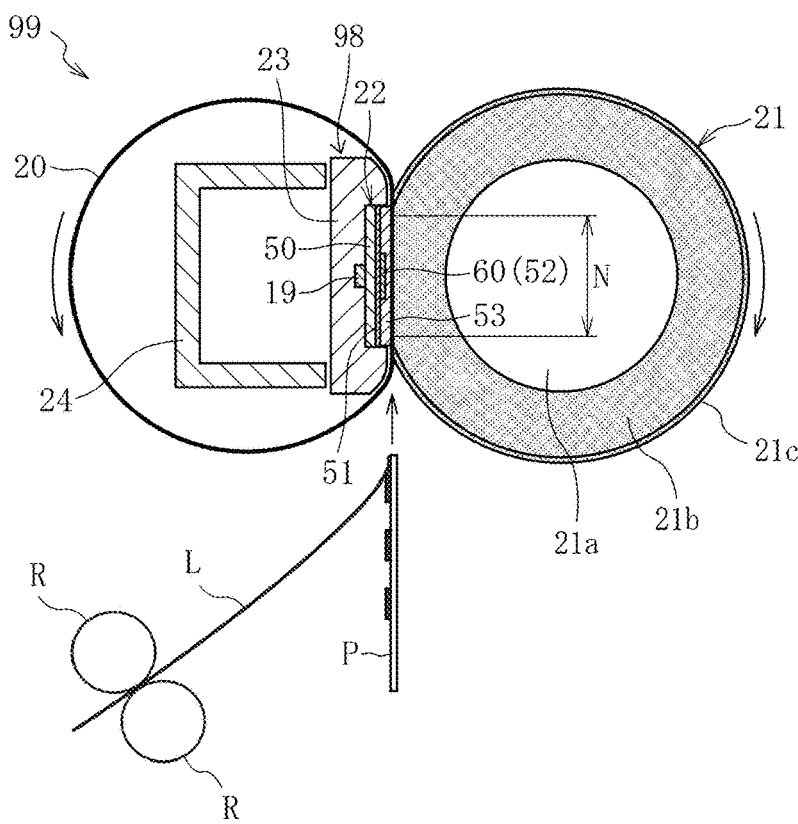
FIG. 70 is a schematic cross-sectional view of a thermocompression bonding apparatus according to an embodiment of the present disclosure.

FIG. 70 is a schematic cross-sectional view of a thermocompression bonding apparatus 99. The thermocompression bonding apparatus 99 laminates a print sheet or the like with a transparent resin film. The thermocompression bonding apparatus 99 includes a conveying roller pair R, serving as a rotator, that conveys a laminating film L to the fixing nip N at a time when a sheet P bearing a toner image is conveyed through the fixing nip N. The fixing belt 20 heated by the heater 22 of the heating device 98 and the pressure roller 21 apply heat and pressure to the laminating film L to weld and bond the laminating film L and the sheet P.

A description is provided of advantages of a heating device (e.g., the heating device 98).

As illustrated in FIGS. 2, 7, 10, 13, and 17, the heating device includes a heater (e.g., the heaters 22, 22A, 22B, 22C, 22E, 22F, 22G, 22H, 22I, 22J, 22K, and 22L) and a feeding member (e.g., the connectors 70, 70A, 70B, 70C, 70D, 70E, and 70F). The heater includes a base (e.g., the base 50) and an electrode (e.g., the electrodes 61) mounted on an electrode mounting face (e.g., the electrode mounting face 50a) of the base. The feeding member includes a connector terminal (e.g., the connector terminals 71) and a restrictor (e.g., the housing 72). The connector terminal contacts the electrode. The restrictor of the feeding member engages the heater. For example, the restrictor engages the heater directly or without a separate member that is separable from the feeding member and the heater and is interposed between the feeding member and the heater. The restrictor restricts displacement of the feeding member relative to the heater bidirectionally in each of a longitudinal direction (e.g., the longitudinal direction Z) of the base, a thickness direction (e.g., the thickness direction Y) of the base, that is perpendicular to the electrode mounting face of the base, and a width direction (e.g., the width direction X) of the base, that is perpendicular to the longitudinal direction and the thickness direction of the base.

Accordingly, displacement of the connector terminal relative to the electrode is suppressed effectively.

According to the embodiments described above, the fixing belt 20 serves as a fixing rotator. Alternatively, a fixing film, a fixing sleeve, or the like may be used as a fixing rotator. Further, the pressure roller 21 serves as a pressure rotator. Alternatively, a pressure belt or the like may be used as a pressure rotator.

According to the embodiments described above, the image forming apparatus 100 is a printer. Alternatively, the image forming apparatus 100 may be a copier, a facsimile machine, a multifunction peripheral (MFP) having at least two of printing, copying, facsimile, scanning, and plotter functions, an inkjet recording apparatus, or the like.

The above-described embodiments are illustrative and do not limit the present disclosure. Thus, numerous additional modifications and variations are possible in light of the above teachings. For example, elements and features of different illustrative embodiments may be combined with each other and substituted for each other within the scope of the present disclosure.

Any one of the above-described operations may be performed in various other ways, for example, in an order different from the one described above.

What is claimed is:

1. A heating device comprising:
   a heater including:
      a base,
      an electrode mounted on an electrode mounting face of the base, and
      another electrode mounted on the base; and
   a feeding member including, a connector terminal configured to contact the electrode, and a restrictor configured to engage the heater, the restrictor configured to restrict displacement of the feeding member relative to the heater, the restrictor including a terminal holder configured to support the connector terminal, the terminal holder including engaging portions configured to engage the heater and restrict displacement of the feeding member relative to the heater bidirectionally in a longitudinal direction of the base, one of the engaging portions being configured to move through a gap between the electrode and said another electrode without contacting the electrode and said another electrode so as to attach the feeding member to the heater.

2. The heating device according to claim 1,
wherein the restrictor is configured to engage the heater directly.

3. The heating device according to claim 1,
wherein the restrictor is configured to restrict displacement of the feeding member relative to the heater bidirectionally in each of a longitudinal direction of the base, a thickness direction of the base, the thickness direction perpendicular to the electrode mounting face of the base, and a width direction of the base, the width direction perpendicular to the longitudinal direction and the thickness direction of the base.

4. The heating device according to claim 1, wherein the terminal holder including engaging portions configured to engage the heater and restrict displacement of the feeding member relative to the heater bidirectionally in a width direction of the base, the width direction perpendicular to a longitudinal direction of the base.

5. The heating device according to claim 4, wherein the engaging portions including a deforming portion configured to deform resiliently in a thickness direction of the base, the thickness direction perpendicular to the electrode mounting face of the base.

6. The heating device according to claim 5,
wherein the connector terminal is configured to contact the electrode while the connector terminal biases the heater in the thickness direction of the base, and
wherein the terminal holder further includes a support configured to support an opposite face of the base, the opposite face being opposite the electrode mounting face of the base.

7. The heating device according to claim 6,
wherein the feeding member further includes a presser configured to press the heater against the support.

8. The heating device according to claim 1,
wherein the heater further includes an engaged portion configured to engage at least one of the engaging portions of the feeding member.

9. The heating device according to claim 8,
wherein the engaging portions includes a projection, and
wherein the engaged portion includes one of a recess, a hole, a through hole, and an edge face of the base.

10. The heating device according to claim 9, wherein the engaging portions include a pawl which includes a slope angled relative to a projecting direction in which the projection projects.

11. The heating device according to claim 9, wherein
the engaged portion includes the recess, and
the recess is disposed at one end of the base in a width direction of the base, the width direction perpendicular to a longitudinal direction of the base.

12. The heating device according to claim 1,
wherein the electrode is disposed in a lateral end span outboard from a center of the base in the longitudinal direction of the base.

13. The heating device according to claim 1, further comprising:
a holder configured to support the heater,
wherein the heater further includes a positioner disposed in one lateral end span outboard from a center of the base in the longitudinal direction of the base, the positioner configured to position the heater with respect to the holder in the longitudinal direction of the base,
wherein the electrode is disposed in another lateral end span outboard from the center of the base in the longitudinal direction of the base, and
wherein the holder does not contact the feeding member.

14. The heating device according to claim 1,
wherein the feeding member includes a connector.

15. An image forming apparatus comprising:
an image forming device configured to form an image; and
a heating device configured to heat a recording medium bearing the image,
the heating device including,
a heater including:
a base, and
an electrode mounted on an electrode mounting face of the base; and
another electrode mounted on the base; and
a feeding member including,
a connector terminal configured to contact the electrode, and
a restrictor configured to engage the heater, the restrictor configured to restrict displacement of the feeding member relative to the heater, the restrictor including a terminal holder configured to support the connector terminal, the terminal holder including engaging portions configured to engage the heater and restrict displacement of the feeding member relative to the heater bidirectionally in a longitudinal direction of the base, one of the engaging portions being configured to move through a gap between the electrode and said another electrode without contacting the electrode and said another electrode so as to attach the feeding member to the heater.

* * * * *